United States Patent
Fischer et al.

(10) Patent No.: US 12,491,000 B2
(45) Date of Patent: Dec. 9, 2025

(54) KNIFE DRIVE MECHANISM

(71) Applicant: CILAG GMBH INTERNATIONAL, Zug (CH)

(72) Inventors: Austin Michael Fischer, Cincinnati, OH (US); Christopher William Birri, West Chester, OH (US); Andrew Kolpitcke, Cincinnati, OH (US)

(73) Assignee: Cilag GmbH International, Zug (CH)

( * ) Notice: Subject to any disclaimer, the term of this patent is extended or adjusted under 35 U.S.C. 154(b) by 333 days.

(21) Appl. No.: 18/356,131

(22) Filed: Jul. 20, 2023

(65) Prior Publication Data

US 2025/0025203 A1    Jan. 23, 2025

(51) Int. Cl.
| | |
|---|---|
| A61B 17/072 | (2006.01) |
| A61B 17/068 | (2006.01) |
| A61B 17/3211 | (2006.01) |
| A61B 34/30 | (2016.01) |
| A61B 17/115 | (2006.01) |
| A61B 17/29 | (2006.01) |
| A61B 34/00 | (2016.01) |

(52) U.S. Cl.
CPC ........ *A61B 17/3211* (2013.01); *A61B 17/068* (2013.01); *A61B 17/072* (2013.01); *A61B 34/30* (2016.02); *A61B 17/07207* (2013.01); *A61B 2017/07214* (2013.01); *A61B 17/115* (2013.01); *A61B 2017/2927* (2013.01); *A61B 2017/32113* (2013.01); *A61B 34/71* (2016.02)

(58) Field of Classification Search
CPC ............... A61B 17/068; A61B 17/072; A61B 17/07207; A61B 17/115; A61B 2017/07214; A61B 2017/07228; A61B 2017/2927; A61B 34/30; A61B 34/32; A61B 34/71
USPC .............. 227/19, 175.1, 176.1, 175.2, 180.1; 606/1, 139, 219
See application file for complete search history.

(56) References Cited

U.S. PATENT DOCUMENTS

| | | | | |
|---|---|---|---|---|
| 2010/0193566 | A1* | 8/2010 | Scheib | A61B 17/07207 227/180.1 |
| 2011/0208211 | A1* | 8/2011 | Whitfield | A61B 17/1222 606/142 |
| 2016/0324518 | A1* | 11/2016 | Nicholas | A61B 17/072 |
| 2018/0271608 | A1* | 9/2018 | Ragosta | F16H 55/17 |
| 2019/0125464 | A1* | 5/2019 | Remm | A61B 18/1445 |
| 2019/0125468 | A1* | 5/2019 | Adams | A61B 17/00234 |
| 2020/0129226 | A1* | 4/2020 | Manzo | A61B 18/1445 |
| 2020/0315728 | A1* | 10/2020 | Johnson | A61B 34/71 |
| 2022/0226059 | A1* | 7/2022 | Beckman | A61B 17/1285 |

* cited by examiner

*Primary Examiner* — Scott A Smith
(74) *Attorney, Agent, or Firm* — Vorys, Sater, Seymour and Pease LLP

(57) ABSTRACT

A surgical tool includes a drive housing, a drive input rotatably mounted to a bottom of the drive housing, a capstan assembly arranged within the drive housing to rotate a drive gear about a rotational axis and within a drive plane orthogonal to the rotational axis, a longitudinally driven gear engageable with the drive gear, and a drive rod operatively coupled to the longitudinally driven gear and extending from the drive housing to a knife extendable within end effector of the surgical instrument. The drive rod is aligned within the drive plane such that translation of the longitudinally driven gear induces a corresponding longitudinal translation of the drive rod within the drive.

20 Claims, 12 Drawing Sheets

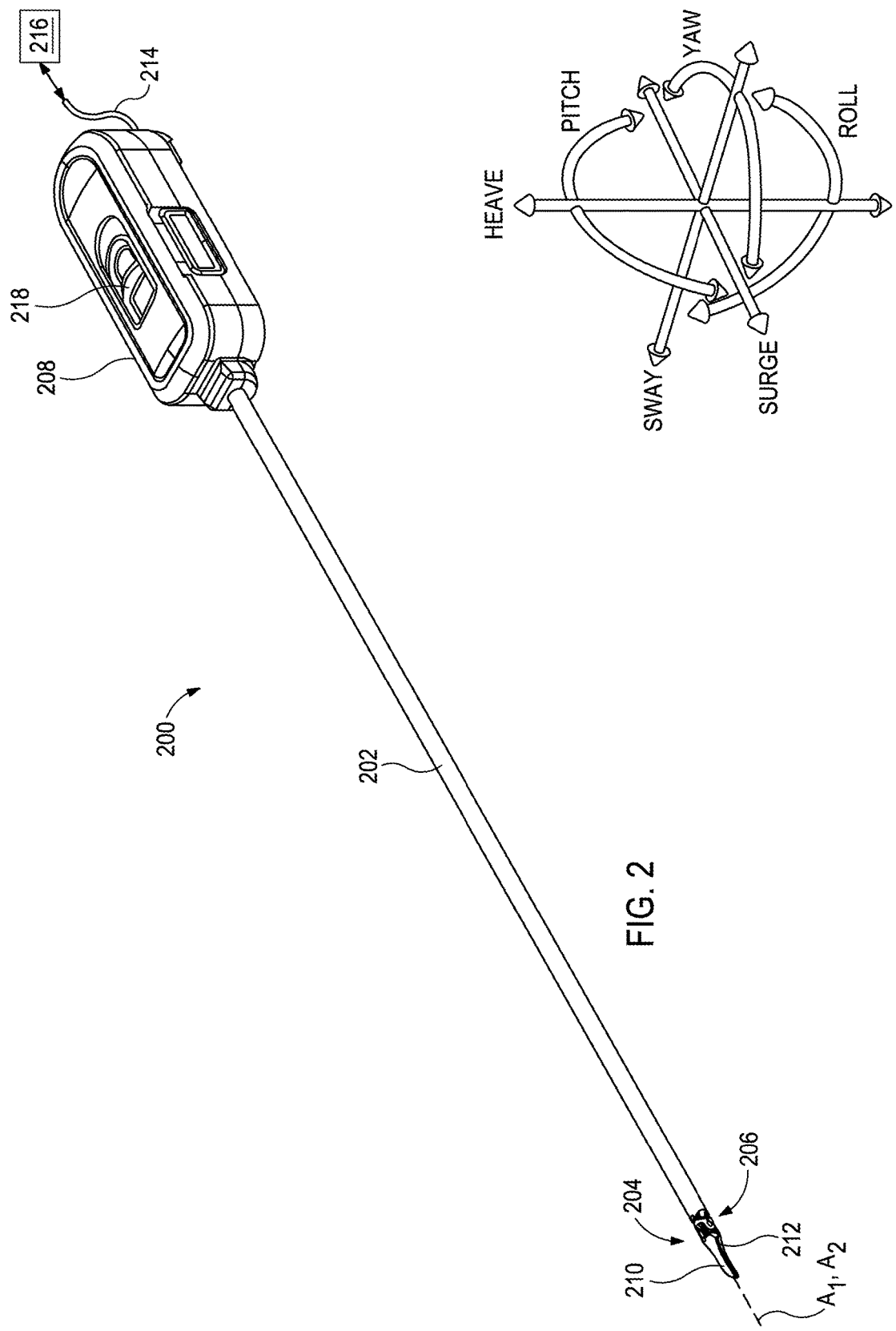

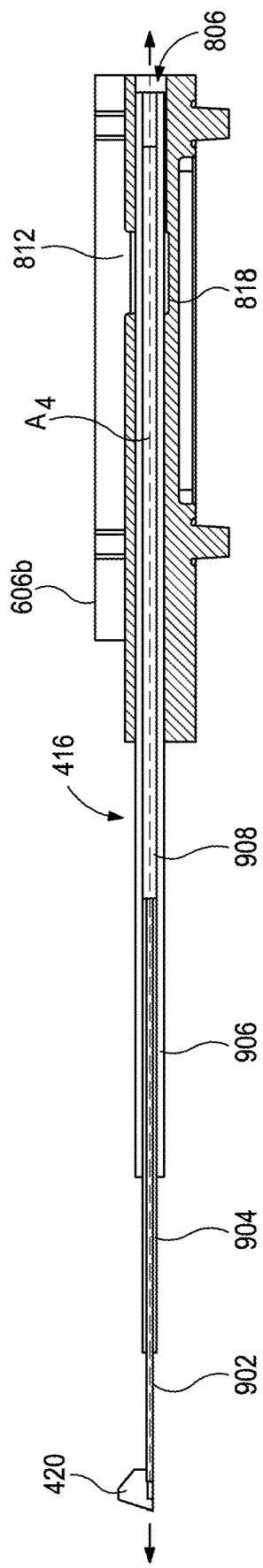
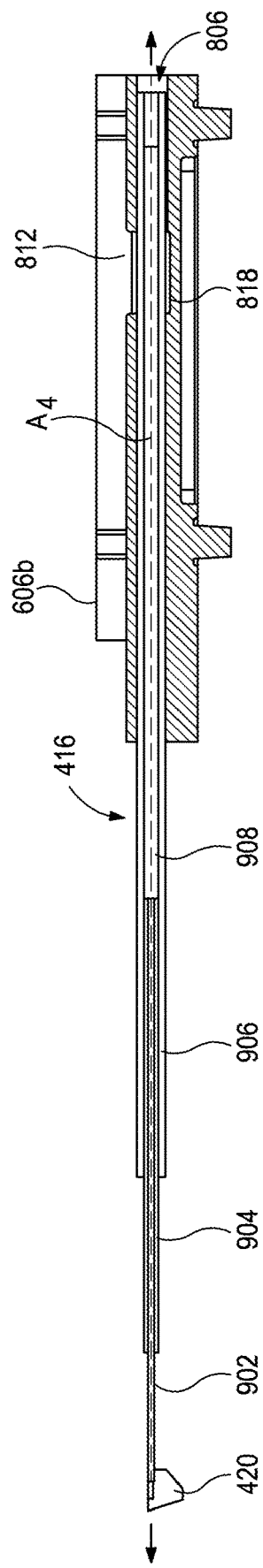
FIG. 9A
FIG. 9B

KNIFE DRIVE MECHANISM

BACKGROUND

Minimally invasive surgical (MIS) instruments are often preferred over traditional open surgical devices due to reduced post-operative recovery time and minimal scarring. Laparoscopic surgery is one type of MIS procedure in which one or more small incisions are formed in the abdomen of a patient and a trocar is inserted through the incision to form a pathway that provides access to the abdominal cavity. Through the trocar, a variety of instruments and surgical tools can be introduced into the abdominal cavity. The instruments and tools introduced into the abdominal cavity via the trocar can be used to engage and/or treat tissue in a number of ways to achieve a diagnostic or therapeutic effect.

Various robotic systems have been developed to assist in MIS procedures. Robotic systems can allow for more instinctive hand movements by maintaining natural eye-hand axis. Robotic systems can also allow for more degrees of freedom in movement by including an articulable "wrist" joint that creates a more natural hand-like articulation. In such systems, an end effector positioned at the distal end of the instrument can be articulated (moved) using a cable driven motion system having one or more drive cables that extend through the wrist joint. A user (e.g., a surgeon) is able to remotely operate the end effector by grasping and manipulating in space one or more controllers that communicate with a tool driver coupled to the surgical instrument. User inputs are processed by a computer system incorporated into the robotic surgical system, and the tool driver responds by actuating the cable driven motion system. Moving the drive cables articulates the end effector to desired angular positions and configurations.

Some end effectors include a cutting instrument or "knife" operable to traverse a guide track to sever tissue. Some end effectors are further operable to deploy staples or sutures as the knife is fired along the guide track. Robotic systems may employ control algorithms to effectively control the position of the knife, but any unintended movement of the knife, or any component of the knife drive mechanism, may frustrate the control algorithm and present hazards to the patient undergoing a surgical operation.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIG. 2 is an isometric side view of an example surgical tool that may incorporate some or all of the principles of the present disclosure.

FIG. 3 illustrates potential degrees of freedom in which the wrist of the surgical tool of FIG. 2 may be able to articulate (pivot) and translate.

FIGS. 9A and 9B are cross-sectional side views of the drive rod of FIG. 8B in an initial position and a rotated position, respectively, within the longitudinally driven gear.

DETAILED DESCRIPTION

The present disclosure is related to robotic surgical systems and, more particularly, to knife drive mechanisms, which operate to advance and retract a knife in a surgical tool.

Embodiments discussed herein describe a surgical tool that includes a drive housing, a drive input rotatably mounted to a bottom of the drive housing, and a drive rod operably coupled to the drive input to translate with respect to the drive housing in response to rotational movement of the drive input. Longitudinal motion of the drive rod advances and retracts a knife coupled at a distal end thereof. The drive rod may be aligned in a plane with a rotary pinion gear coupled to the drive input and a longitudinally driven gear intermeshed, or otherwise operatively engaged, with the rotary pinion gear. Such alignment of the drive rod reduces off-axis loading, which could lead to tilting of the longitudinally driven gear and unintended movement of the knife. Radial load reactors, such as bearings, may be provided above and below the rotary pinion gear on a capstan assembly that rotates along with the drive input and the rotary pinion gear. The radial load reactors prevent tilting of the pinion gear within the drive housing, which could also lead to unintended movement of the knife.

Embodiments of the knife drive mechanism may include a single pinion mechanism, or a dual pinion mechanism with primary and secondary rotary pinion gears engaged with the longitudinally driven gear. In a dual pinion mechanism, the secondary rotary pinion gear may be active, e.g., coupled to a robotically controlled drive input, or passive, e.g., operatively coupled to a biasing mechanism. Embodiments of the drive rods may include a plurality of tubes and rods connected in series and increasingly stepped in diameter in a proximal direction. A rotating collar may couple the drive rod to the longitudinally driven gear such that the drive rod may rotate freely with respect to the longitudinally driven gear during roll operations. The rotating collar may be installed after the series of tubes and rods are assembled such that any tolerance stack-up of the tubes and rods may be accommodated.

Figure 1:
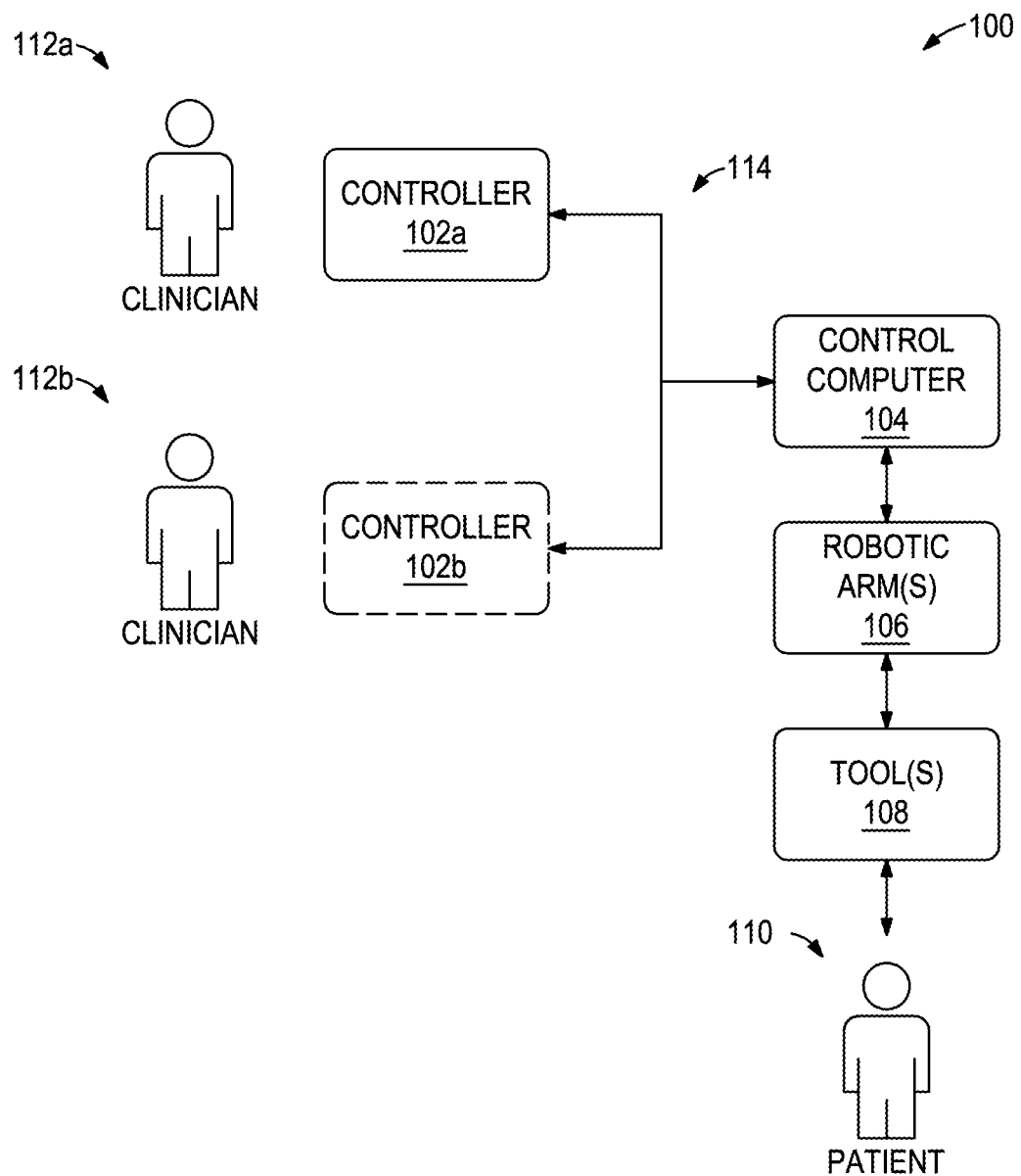
FIG. 1 is a block diagram of an example robotic surgical system that may incorporate some or all of the principles of the present disclosure.

FIG. 1 is a block diagram of an example robotic surgical system 100 that may incorporate some or all of the principles of the present disclosure. As illustrated, the system 100 can include at least one set of user input controllers 102a and at least one control computer 104. The control computer 104 may be mechanically and/or electrically coupled to a robotic manipulator and, more particularly, to one or more robotic arms 106 (alternately referred to as "tool drivers"). In some embodiments, the robotic manipulator may be included in or otherwise mounted to an arm cart capable of making the system portable. Each robotic arm 106 may include and otherwise provide a location for mounting one or more surgical instruments or tools 108 for performing various surgical tasks on a patient 110. Operation of the robotic arms 106 and associated tools 108 may be directed by a clinician 112a (e.g., a surgeon) from the user input controller 102a.

In some embodiments, a second set of user input controllers 102b (shown in dashed line) may be operated by a second clinician 112b to direct operation of the robotic arms 106 and tools 108 via the control computer 104 and in conjunction with the first clinician 112a. In such embodiments, for example, each clinician 112a,b may control different robotic arms 106 or, in some cases, complete control of the robotic arms 106 may be passed between the clinicians 112a,b as needed. In some embodiments, additional robotic manipulators having additional robotic arms may be utilized during surgery on the patient 110, and these additional robotic arms may be controlled by one or more of the user input controllers 102a,b.

The control computer 104 and the user input controllers 102a,b may be in communication with one another via a communications link 114, which may be any type of wired or wireless telecommunications means configured to carry a variety of communication signals (e.g., electrical, optical, infrared, etc.) according to any communications protocol. In some applications, for example, there is a tower with ancillary equipment and processing cores designed to drive the robotic arms 106.

The user input controllers 102a,b generally include one or more physical controllers that can be grasped by the clinicians 112a,b and manipulated in space while the surgeon views the procedure via a stereo display. The physical controllers generally comprise manual input devices movable in multiple degrees of freedom, and which often include an actuatable handle for actuating the surgical tool(s) 108, for example, for opening and closing opposing jaws, applying an electrical potential (current) to an electrode, or the like. The control computer 104 can also include an optional feedback meter viewable by the clinicians 112a,b via a display to provide a visual indication of various surgical instrument metrics, such as the amount of force being applied to the surgical instrument (i.e., a cutting instrument or dynamic clamping member).

FIG. 2 is an isometric side view of an example surgical tool 200 that may incorporate some or all of the principles of the present disclosure. The surgical tool 200 may be the same as or similar to the surgical tool(s) 108 of FIG. 1 and, therefore, may be used in conjunction with a robotic surgical system, such as the robotic surgical system 100 of FIG. 1. Accordingly, the surgical tool 200 may be designed to be releasably coupled to a tool driver included in the robotic surgical system 100. In other embodiments, however, aspects of the surgical tool 200 may be adapted for use in a manual or hand-operated manner, without departing from the scope of the disclosure.

As illustrated, the surgical tool 200 includes an elongated shaft 202, an end effector 204, a wrist 206 (alternately referred to as a "wrist joint" or an "articulable wrist joint") that couples the end effector 204 to the distal end of the shaft 202, and a drive housing 208 coupled to the proximal end of the shaft 202. In applications where the surgical tool is used in conjunction with a robotic surgical system (e.g., the robotic surgical system 100 of FIG. 1), the drive housing 208 can include coupling features that releasably couple the surgical tool 200 to the robotic surgical system.

The terms "proximal" and "distal" are defined herein relative to a robotic surgical system having an interface configured to mechanically and electrically couple the surgical tool 200 (e.g., the housing 208) to a robotic manipulator. The term "proximal" refers to the position of an element closer to the robotic manipulator and the term "distal" refers to the position of an element closer to the end effector 204 and thus further away from the robotic manipulator. Alternatively, in manual or hand-operated applications, the terms "proximal" and "distal" are defined herein relative to a user, such as a surgeon or clinician. The term "proximal" refers to the position of an element closer to the user and the term "distal" refers to the position of an element closer to the end effector 204 and thus further away from the user. Moreover, the use of directional terms such as above, below, upper, lower, upward, downward, left, right, and the like are used in relation to the illustrative embodiments as they are depicted in the figures, the upward or upper direction being toward the top of the corresponding figure and the downward or lower direction being toward the bottom of the corresponding figure.

During use of the surgical tool 200, the end effector 204 is configured to move (pivot) relative to the shaft 202 at the wrist 206 to position the end effector 204 at desired orientations and locations relative to a surgical site. To accomplish this, the housing 208 includes (contains) various drive inputs and mechanisms (e.g., gears, actuators, etc.) designed to control operation of various features associated with the end effector 204 (e.g., clamping, firing, cutting, rotation, articulation, etc.). In at least some embodiments, the shaft 202, and hence the end effector 204 coupled thereto, is configured to rotate about a longitudinal axis $A_1$ of the shaft 202. In such embodiments, at least one of the drive inputs included in the housing 208 is configured to control rotational movement of the shaft 202 about the longitudinal axis $A_1$.

The shaft 202 is an elongate member extending distally from the housing 208 and has at least one lumen extending therethrough along its axial length. In some embodiments, the shaft 202 may be fixed to the housing 208, but could alternatively be rotatably mounted to the housing 208 to allow the shaft 202 to rotate about the longitudinal axis $A_1$. In yet other embodiments, the shaft 202 may be releasably coupled to the housing 208, which may allow a single housing 208 to be adaptable to various shafts having different end effectors.

The end effector 204 can exhibit a variety of sizes, shapes, and configurations. In the illustrated embodiment, the end effector 204 comprises a combination tissue grasper and vessel sealer that include opposing first (upper) and second (lower) jaws 210, 212 configured to move (articulate) between open and closed positions. As will be appreciated, however, the opposing jaws 210, 212 may alternatively form part of other types of end effectors such as, but not limited to, a surgical scissors, a clip applier, a needle driver, a babcock including a pair of opposed grasping jaws, bipolar jaws (e.g., bipolar Maryland grasper, forceps, a fenestrated grasper, etc.), etc. One or both of the jaws 210, 212 may be configured to pivot to articulate the end effector 204 between the open and closed positions.

FIG. 3 illustrates the potential degrees of freedom in which the wrist 206 may be able to articulate (pivot) and thereby move the end effector 204. The wrist 206 can have any of a variety of configurations. In general, the wrist 206 comprises a joint configured to allow pivoting movement of the end effector 204 relative to the shaft 202. The degrees of freedom of the wrist 206 are represented by three translational variables (i.e., surge, heave, and sway), and by three rotational variables (i.e., Euler angles or roll, pitch, and yaw). The translational and rotational variables describe the position and orientation of the end effector 204 with respect to a given reference Cartesian frame. As depicted in FIG. 3, "surge" refers to forward and backward translational movement, "heave" refers to translational movement up and down, and "sway" refers to translational movement left and right. With regard to the rotational terms, "roll" refers to tilting side to side, "pitch" refers to tilting forward and backward, and "yaw" refers to turning left and right.

The pivoting motion can include pitch movement about a first axis of the wrist 206 (e.g., X-axis), yaw movement about a second axis of the wrist 206 (e.g., Y-axis), and combinations thereof to allow for 360° rotational movement of the end effector 204 about the wrist 206. In other applications, the pivoting motion can be limited to movement in a single plane, e.g., only pitch movement about the first axis of the wrist 206 or only yaw movement about the second axis of the wrist 206, such that the end effector 204 moves only in a single plane.

Referring again to FIG. 2, the surgical tool 200 may also include a plurality of drive cables (obscured in FIG. 2) that form part of a cable driven motion system configured to facilitate actuation and articulation of the end effector 204 relative to the shaft 202. Moving (actuating) one or more of the drive cables moves the end effector 204 between an unarticulated position and an articulated position. The end effector 204 is depicted in FIG. 2 in the unarticulated position where a longitudinal axis $A_2$ of the end effector 204 is substantially aligned with the longitudinal axis $A_1$ of the shaft 202, such that the end effector 204 is at a substantially zero angle relative to the shaft 202. Due to factors such as manufacturing tolerance and precision of measurement devices, the end effector 204 may not be at a precise zero angle relative to the shaft 202 in the unarticulated position, but nevertheless be considered "substantially aligned" thereto. In the articulated position, the longitudinal axes $A_1$, $A_2$ would be angularly offset from each other such that the end effector 204 is at a non-zero angle relative to the shaft 202.

In some embodiments, the surgical tool 200 may be supplied with electrical power (current) via a power cable 214 coupled to the housing 208. In other embodiments, the power cable 214 may be omitted and electrical power may be supplied to the surgical tool 200 via an internal power source, such as one or more batteries, capacitors, or fuel cells. In such embodiments, the surgical tool 200 may alternatively be characterized and otherwise referred to as an "electrosurgical instrument" capable of providing electrical energy to the end effector 204.

The power cable 214 may place the surgical tool 200 in electrical communication with a generator 216 that supplies energy, such as electrical energy (e.g., radio frequency energy), ultrasonic energy, microwave energy, heat energy, or any combination thereof, to the surgical tool 200 and, more particularly, to the end effector 204. Accordingly, the generator 216 may comprise a radio frequency (RF) source, an ultrasonic source, a direct current source, and/or any other suitable type of electrical energy source that may be activated independently or simultaneously.

In applications where the surgical tool 200 is configured for bipolar operation, the power cable 214 will include a supply conductor and a return conductor. Current can be supplied from the generator 216 to an active (or source) electrode located at the end effector 204 via the supply conductor, and current can flow back to the generator 216 via a return electrode located at the end effector 204 via the return conductor. In the case of a bipolar grasper with opposing jaws, for example, the jaws serve as the electrodes where the proximal end of the jaws are isolated from one another and the inner surface of the jaws (i.e., the area of the jaws that grasp tissue) apply the current in a controlled path through the tissue. In applications where the surgical tool 200 is configured for monopolar operation, the generator 216 transmits current through a supply conductor to an active electrode located at the end effector 204, and current is returned (dissipated) through a return electrode (e.g., a grounding pad) separately coupled to a patient's body.

The surgical tool 200 may further include a manual release switch 218 that may be manually actuated by a user (e.g., a surgeon) to override the cable driven system and thereby manually articulate or operate the end effector 204. The release switch 218 is movably positioned on the drive housing 208, and a user is able to manually move (slide) the release switch 218 from a disengaged position, as shown, to an engaged position. In the disengaged position, the surgical tool 200 is able to operate as normal. As the release switch 218 moves to the engaged position, however, various internal component parts of the drive housing 208 are simultaneously moved, thereby resulting in the jaws 210, 212 opening, which might prove beneficial for a variety of reasons. In some applications, for example, the release switch 218 may be moved in the event of an electrical disruption that renders the surgical tool 200 inoperable. In such applications, the user would be able to manually open the jaws 210, 212 and thereby release any grasped tissue and remove the surgical tool 200. In other applications, the release switch 218 may be actuated (enabled) to open the jaws 210, 212 in preparation for cleaning and/or sterilization of the surgical tool 200.

Figure 4A:
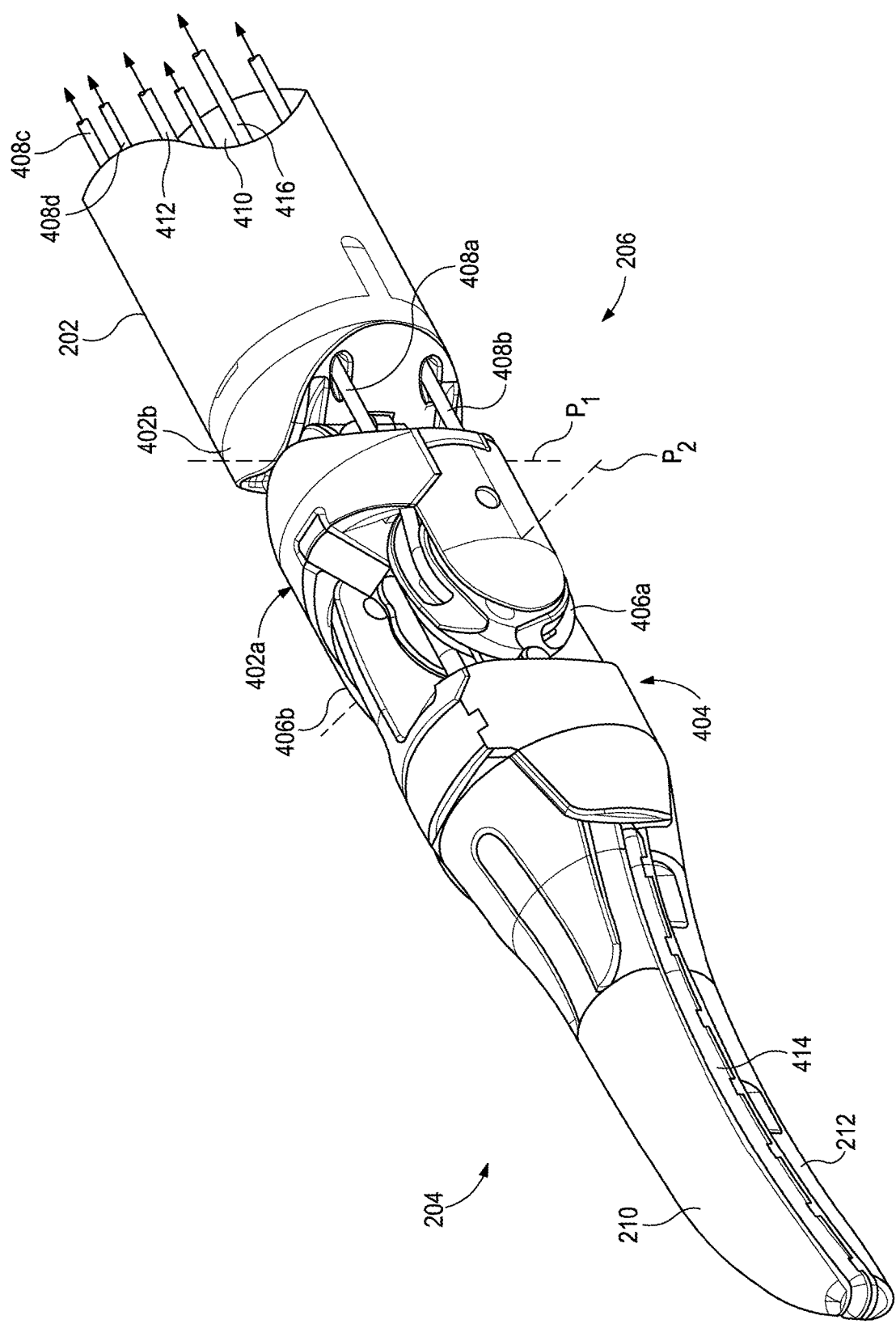
FIG. 4A is an enlarged isometric view of the distal end of the surgical tool of FIG. 2.

FIG. 4A is an enlarged isometric view of the distal end of the surgical tool 200. More specifically, FIG. 4A depicts an enlarged view of the end effector 204 and the wrist 206, with the jaws 210, 212 of the end effector 204 in the closed position. The wrist 206 operatively couples the end effector 204 to the shaft 202. In some embodiments, however, a shaft adapter may be directly coupled to the wrist 206 and otherwise interpose the shaft 202 and the wrist 206. Accordingly, the wrist 206 may be operatively coupled to the shaft 202 either through a direct coupling engagement where the wrist 206 is directly coupled to the distal end of the shaft 202, or an indirect coupling engagement where a shaft adapter interposes the wrist 206 and the distal end of the shaft 202. As used herein, the term "operatively couple" refers to a direct or indirect coupling engagement between two components.

To operatively couple the end effector 204 to the shaft 202, the wrist 206 includes a first or "distal" clevis 402a and a second or "proximal" clevis 402b. The clevises 402a,b are alternatively referred to as "articulation joints" of the wrist 206 and extend from the shaft 202 (or alternatively a shaft adapter). The clevises 402a,b are operatively coupled to facilitate articulation of the wrist 206 relative to the shaft 202. As illustrated, the wrist 206 also includes a linkage 404 arranged distal to the distal clevis 402a and operatively mounted to the jaws 210, 212.

The proximal end of the distal clevis 402a may be rotatably mounted or pivotably coupled to the proximal clevis 402b at a first pivot axis $P_1$ of the wrist 206. In some embodiments, an axle may extend through the first pivot axis $P_1$ and the distal and proximal clevises 402a,b may be rotatably coupled via the axle. In other embodiments, however, such as is depicted in FIG. 4A, the distal and proximal clevises 402a,b may be engaged in rolling contact, such as via an intermeshed gear relationship that allows the clevises 402a,b to rotate relative to each other similar to a rolling joint.

First and second pulleys 406a and 406b may be rotatably mounted to the distal end of the distal clevis 402a at a second pivot axis $P_2$ of the wrist 206. The linkage 404 may be arranged distal to the second pivot axis $P_2$ and operatively mounted to the jaws 210, 212. The first pivot axis $P_1$ is substantially perpendicular (orthogonal) to the longitudinal axis $A_1$ of the shaft 202, and the second pivot axis $P_2$ is substantially perpendicular (orthogonal) to both the longitudinal axis $A_1$ and the first pivot axis $P_1$. Movement of the end effector 204 about the first pivot axis $P_1$ provides "yaw" articulation of the wrist 206, and movement about the second pivot axis $P_2$ provides "pitch" articulation of the wrist 206.

A plurality of drive cables, shown as drive cables 408a, 408b, 408c, and 408d, extend longitudinally within a lumen 410 defined by the shaft 202 (or a shaft adaptor) and extend at least partially through the wrist 206. The drive cables 408a-d may form part of the cable driven motion system housed within the drive housing 208 (FIG. 2), and may comprise cables, bands, lines, cords, wires, woven wires, ropes, strings, twisted strings, elongate members, belts, shafts, flexible shafts, drive rods, or any combination thereof. The drive cables 408a-d can be made from a variety of materials including, but not limited to, a metal (e.g., tungsten, stainless steel, nitinol, etc.), a polymer (e.g., ultra-high molecular weight polyethylene), a synthetic fiber (e.g., KEVLAR®, VECTRAN®, etc.), an elastomer, or any combination thereof. While four drive cables 408a-d are depicted in FIG. 4A, more or less than four may be employed, without departing from the scope of the disclosure.

The drive cables 408a-d extend proximally from the end effector 204 and the wrist 206 toward the drive housing 208 (FIG. 2) where they are operatively coupled to various actuation mechanisms or devices that facilitate longitudinal movement (translation) of the drive cables 408a-d within the lumen 410. Selective actuation of the drive cables 408a-d applies tension (i.e., pull force) to the given drive cable 408a-d in the proximal direction, which urges the given drive cable 408a-d to translate longitudinally within the lumen 410.

In the illustrated embodiment, the drive cables 408a-d each extend longitudinally through the proximal clevis 402b. The distal end of each drive cable 408a-d terminates at the first or second pulleys 406a,b, thus operatively coupling each drive cable 408a-d to the end effector 204. In some embodiments, the distal ends of the first and second drive cables 408a,b may be coupled to each other and terminate at the first pulley 406a, and the distal ends of the third and fourth drive cables 408c,d may be coupled to each other and terminate at the second pulley 406b. In at least one embodiment, the distal ends of the first and second drive cables 408a,b and the distal ends of the third and fourth drive cables 408c,d may each be coupled together at corresponding ball crimps (not shown) mounted to the first and second pulleys 406a,b, respectively.

In at least one embodiment, the drive cables 408a-d may operate "antagonistically". More specifically, when the first drive cable 408a is actuated (moved), the second drive cable 408b naturally follows as coupled to the first drive cable 408a, and when the third drive cable 408c is actuated, the fourth drive cable 408d naturally follows as coupled to the third drive cable 408c, and vice versa. Antagonistic operation of the drive cables 408a-d can open or close the jaws 210, 212. More specifically, selective actuation of the drive cables 408a-d in other known configurations or coordination will cause the jaws 210, 212 to open or close. Antagonistic operation of the drive cables 408a-d can further cause the end effector 204 to articulate at the wrist 206. More specifically, selective actuation of the drive cables 408a-d in known configurations or coordination can cause the end effector 204 to articulate about one or both of the pivot axes $P_1$, $P_2$, thus facilitating articulation of the end effector 204 in both pitch and yaw directions, either individually or simultaneously. Antagonistic operation of the drive cables 408a-d advantageously reduces the number of cables required to provide full wrist 206 motion, and also helps eliminate slack in the drive cables 408a-d, which results in more precise motion of the end effector 204.

In the illustrated embodiment, the end effector 204 is able to articulate (move) in pitch about the second or "pitch" pivot axis $P_2$, which is located near the distal end of the wrist 206. Thus, the jaws 210, 212 open and close in the direction of pitch. In other embodiments, however, the wrist 206 may alternatively be configured such that the second pivot axis $P_2$ facilitates yaw articulation of the jaws 210, 212, without departing from the scope of the disclosure.

In some embodiments, an electrical conductor 412 may also extend longitudinally within the lumen 410, through the wrist 206, and terminate at an electrode 414 to supply electrical energy to the end effector 204. In some embodiments, the electrical conductor 412 may comprise a wire, but may alternatively comprise a rigid or semi-rigid shaft, rod, or strip (ribbon) made of a conductive material. The electrical conductor 412 may be entirely or partially covered with an insulative covering (overmold) made of a non-conductive material. Using the electrical conductor 412 and the electrode 414, the end effector 204 may be configured for monopolar or bipolar RF operation.

In the illustrated embodiment, the end effector 204 comprises a combination tissue grasper and vessel sealer that includes a knife 420 (FIG. 4B), alternately referred to as a "cutting element" or "blade." The knife is aligned with and configured to traverse a guide track 422 (FIG. 4B) defined longitudinally in one or both of the upper and lower jaws 210, 212. The knife 420 may be operatively coupled to the distal end of a drive rod 416 that extends longitudinally within the lumen 410 and passes through the wrist 206. Longitudinal movement (translation) of the drive rod 416 correspondingly moves the knife 420 within the guide track(s) 422. Similar to the drive cables 408a-d, the drive rod 416 may form part of the actuation systems housed within the drive housing 208 (FIG. 2). Selective actuation of a corresponding drive input will cause the drive rod 416 to move distally or proximally within the lumen 410, and correspondingly move the knife 420 in the same longitudinal direction.

Figure 4B:
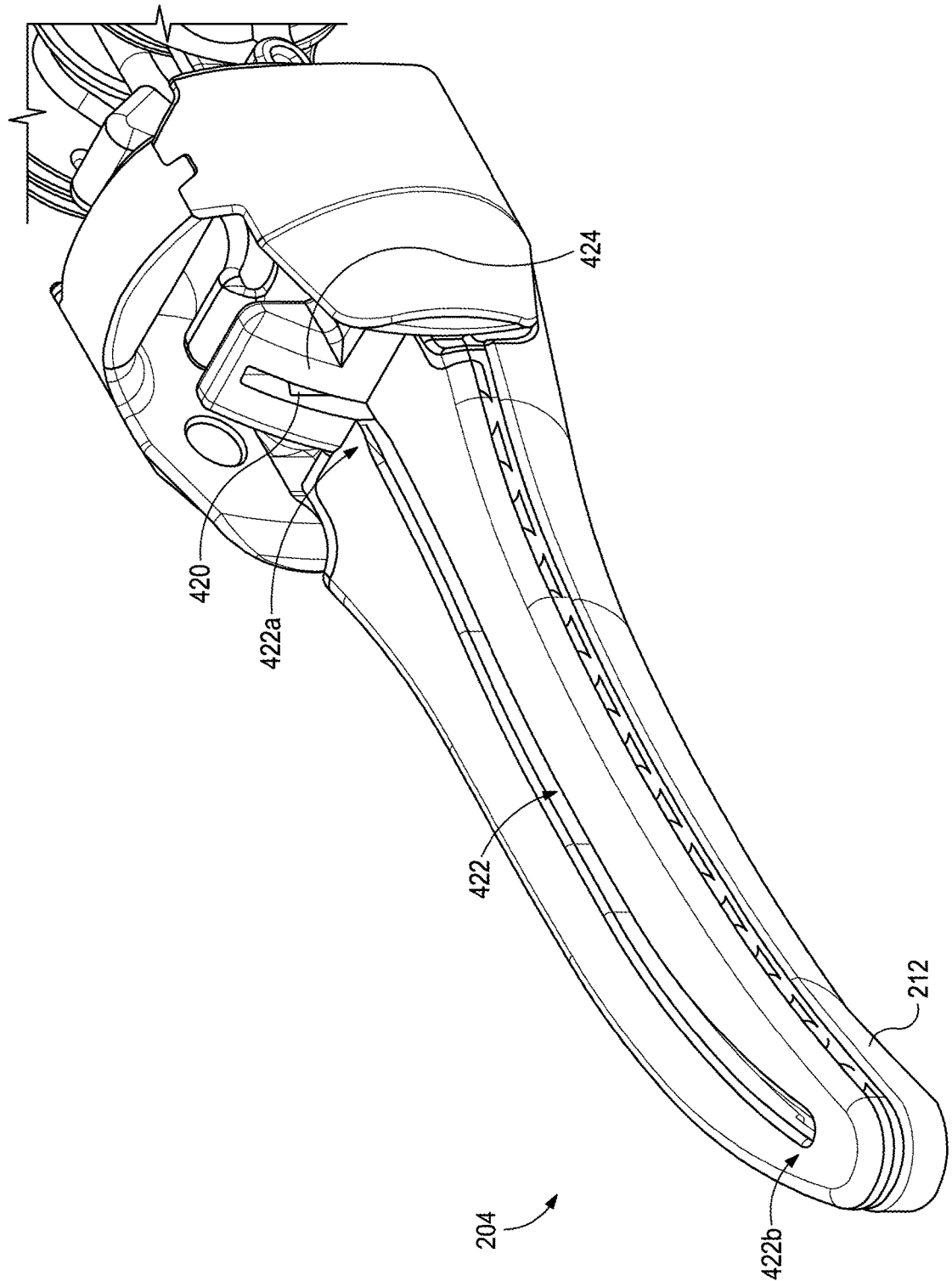
FIG. 4B is a partial isometric view of the distal end of the surgical tool of FIG. 2 with a jaw removed.

FIG. 4B is a partial isometric view of the distal end of the surgical tool 200 with the first jaw 210 (FIG. 4A) removed. With the first jaw 210 removed, the guide track 422 defined in the second jaw 212 is visible extending from a proximal end 422a to a distal end 422b. In some embodiments, the first jaw 210 may include a similar or complimentary guide track (not shown) in opposition to the guide track 422 when the first and second jaws 210, 212 are closed. The knife 420 (partially visible) is illustrated in a "zero" or "home" position wherein the knife 420 is disposed within a knife housing 424 adjacent the proximal end 422a of the guide track 422. The knife housing 424 may be constructed of a non-conductive material and as a separate component. When the knife 420 is disposed within the knife housing 424, the end effector 204 may be safely handled for cleaning or maintenance. In operation, the knife 420 may be selectively moved distally out of the knife housing 424 along the guide track 422 by longitudinally moving the drive rod 416 as described above.

Figure 5:
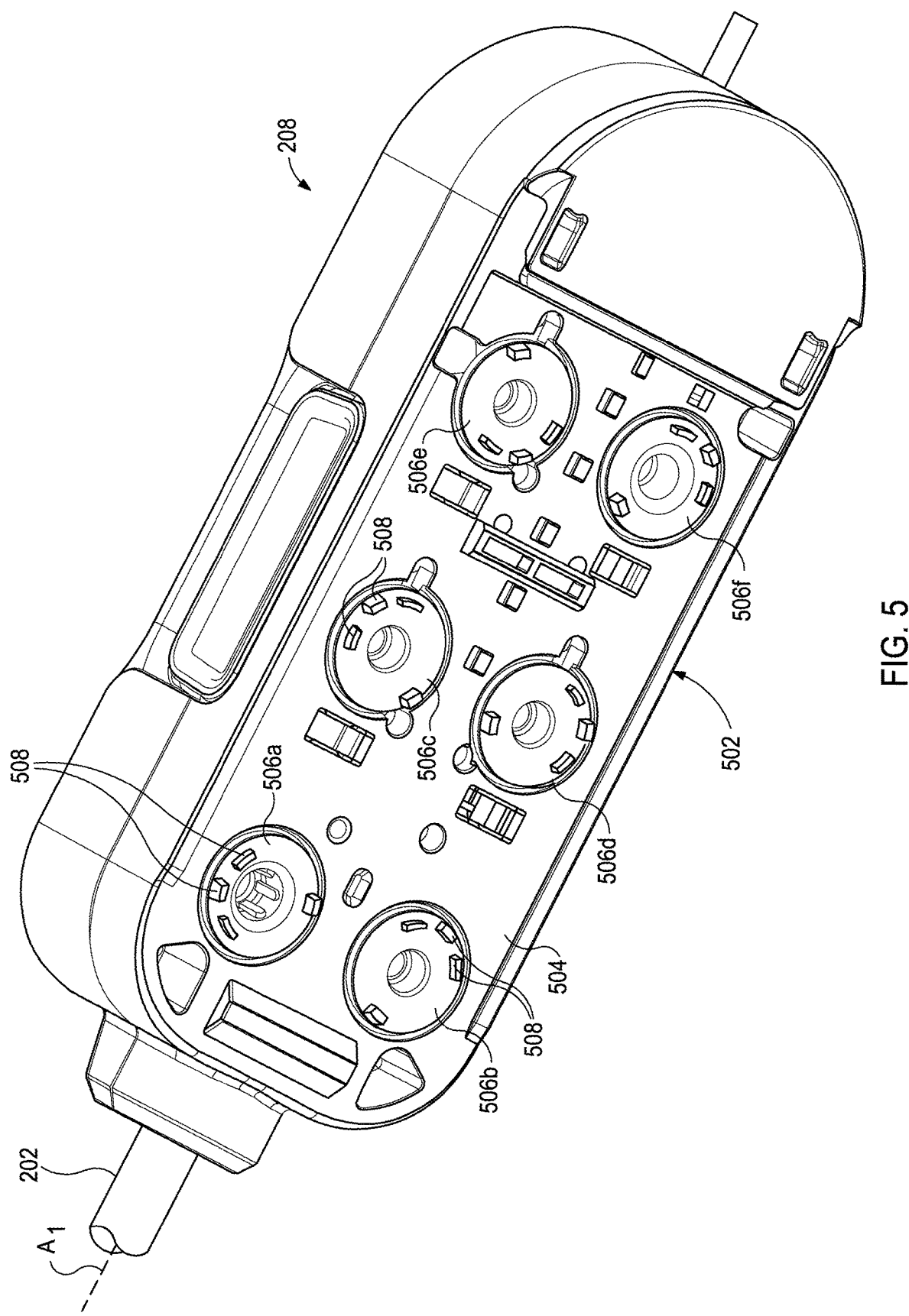
FIG. 5 is a bottom view of the drive housing of FIG. 2, according to one or more embodiments.

FIG. 5 is a bottom view of the drive housing 208, according to one or more embodiments. As illustrated, the drive housing 208 may include a tool mounting portion 502 used to operatively couple the drive housing 208 to a tool driver of a robotic manipulator. The tool mounting portion 502 may releasably couple the drive housing 208 to a tool driver in a variety of ways, such as by clamping thereto, clipping thereto, or slidably mating therewith. In some embodiments, the tool mounting portion 502 may include an array of electrical connecting pins, which may be coupled to an electrical connection on the mounting surface of the tool driver. While the tool mounting portion 502 is described herein with reference to mechanical, electrical, and magnetic coupling elements, it should be understood that a wide variety of telemetry modalities might be used, including infrared, inductive coupling, or the like.

The tool mounting portion 502 includes and otherwise provides an interface 504 configured to mechanically, magnetically, and/or electrically couple the drive housing 208 to the tool driver. As illustrated, the interface 504 includes and supports a plurality of drive inputs, shown as drive inputs 506a, 506b, 506c, 506d, 506e, and 506f. Each drive input 506a-f comprises a rotatable disc configured to align with and couple to a corresponding actuator or "drive output" of a tool driver, such that rotation (actuation) of a given drive output drives (rotates) a corresponding one of the drive inputs 506a-f. Each drive input 506a-f may provide or define one or more surface features 508 configured to align with mating surface features provided on the corresponding drive output. The surface features 508 can include, for example, various protrusions and/or indentations that facilitate a mating engagement. In some embodiments, some or all of the drive inputs 506a-f may include one surface feature 508 that is positioned closer to an axis of rotation of the associated drive input 506a-f than the other surface feature(s) 508. This may help to ensure positive angular alignment of each drive input 506a-f.

In some embodiments, actuation of the first drive input 506a may be configured to control rotation of the shaft 202 about its longitudinal axis $A_1$. The shaft 202 may be rotated clockwise or counter-clockwise depending on the rotational actuation of the first drive input 506a. In some embodiments, actuation of the second, third, fourth, and fifth drive inputs 506b-e may be configured to operate movement (axial translation) of the drive cables 408a-d (FIG. 4A), which results in the actuation of the wrist 206 (FIG. 4A) and/or articulation (operation) of the end effector 204 (FIG. 4A). In some embodiments, actuation of the sixth drive input 506f may be configured to advance and retract the drive rod 416 (FIG. 4A), and thereby correspondingly advance or retract the knife 420 (FIG. 4B) at the end effector 204. Each of the drive inputs 506a-f may be actuated based on user inputs communicated to the tool driver coupled to the interface 504, and the user inputs may be received via a computer system incorporated into the robotic surgical system.

Figure 6:
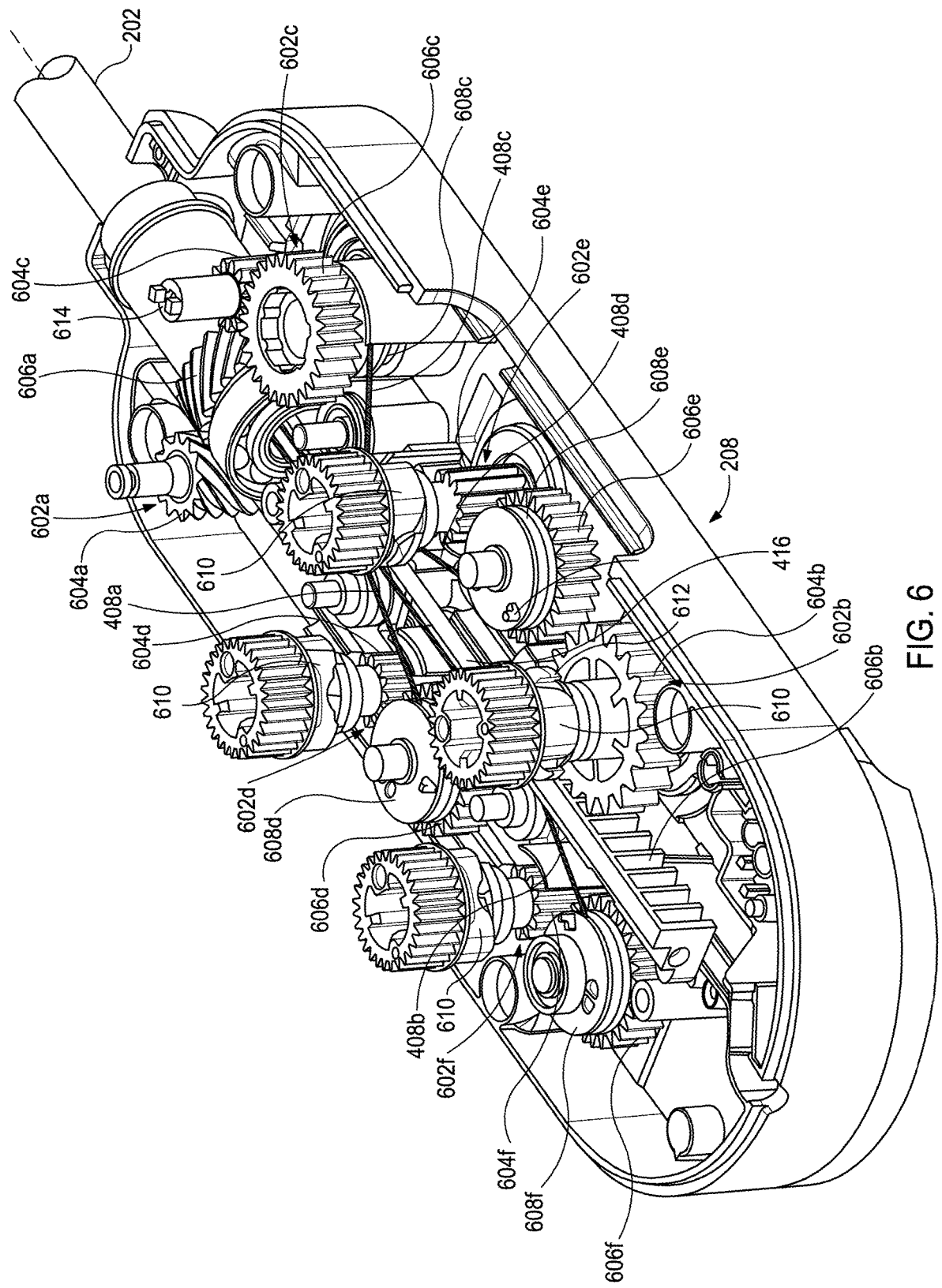
FIG. 6 is an exposed isometric view of the interior of the drive housing of FIG. 2, partially illustrating a plurality of capstan assemblies for driving a knife and other functions of the surgical tool, according to one or more embodiments.

FIG. 6 is an exposed isometric view of the interior of the drive housing 208, according to one or more embodiments. Several component parts that may be otherwise contained within the drive housing 208 are not shown in FIG. 6 to enable discussion of the depicted component parts. As illustrated, the drive housing 208 houses and otherwise contains a plurality of capstan assemblies operable to operate surgical tool 200 (FIG. 2). In particular, a first capstan assembly 602a is contained (housed) within the drive housing 208. As illustrated, the first capstan assembly 602a may include a drive gear 604a, which may be operatively coupled to or extend from the first drive input 506a (FIG. 5) such that actuation of the first drive input 506a results in rotation of the drive gear 604a. In the illustrated embodiment, the drive gear 604a comprises a worm gear, e.g., a crossed helical or screw gear, which may be configured to mesh and interact with a driven gear 606a secured within the drive housing 208 and operatively coupled to the shaft 202 such that rotation of the driven gear 606a correspondingly rotates the shaft 202. Accordingly, actuation of the first capstan assembly 602a, via actuation of the first drive input 506a, will drive the driven gear 606a and thereby control rotation of the elongate shaft 202 about the longitudinal axis $A_1$.

The drive housing 208 may further contain or house a second capstan assembly 602b, which may include a drive gear 604b operatively coupled to or extending from the sixth drive input 506f (FIG. 5) such that actuation of the sixth drive input 506f results in rotation of the drive gear 604b. The drive gear 604b is a rotary pinion gear arranged to intermesh with a longitudinally driven gear 606b positioned within the drive housing 208. In the illustrated embodiment, the driven gear 606b comprises a rack gear longitudinally translatable within the drive housing 208 as acted upon by the drive gear 604b. The drive rod 416 may be operatively coupled to the driven gear 606b and extend distally therefrom to the end effector 204 (FIGS. 2 and 4). Accordingly, actuation of the second capstan assembly 602b, via actuation of the sixth drive input 506f, will cause the driven gear 606b to longitudinally translate and correspondingly advance or retract the drive rod 416 and the knife 420 (FIG. 4B) coupled to the end of the drive rod 416 at the end effector 204.

The drive housing 208 further contains or houses third, fourth, fifth, and sixth capstan assemblies 602c, 602d, 602e, and 602f, alternately be referred to as "drive cable" capstan assemblies since they are operable to actuate the drive cables 408a-d, as described below. While four "drive cable" capstan assemblies 602c-f are depicted in FIG. 6, alternative embodiments may include more or less than four, depending on how many drive cables 408a-d are used.

In the illustrated embodiment, the third capstan assembly 602c is actuated through operation (rotation) of the second drive input 506b (FIG. 5), the fourth capstan assembly 602d is actuated through operation (rotation) of the third drive input 506c (FIG. 5), the fifth capstan assembly 602e is actuated through operation (rotation) of the fourth drive input 506d (FIG. 5), and the sixth capstan assembly 602f is actuated through operation (rotation) of the fifth drive input 506e (FIG. 5). As illustrated, each capstan assembly 602c-f includes a drive gear 604c, 604d, 604e, and 604f that is coupled to or extends from the corresponding drive input 506b-e, respectively, such that actuation (rotation) of the drive input 506b-e correspondingly rotates the associated drive gear 604c-f, respectively.

Moreover, each drive gear 604c-f is positioned to mesh and interact with a corresponding driven gear 606c, 606d, 606e, and 606f rotatably mounted within the drive housing 208. Each driven gear 606c-f includes or is otherwise coupled to a corresponding cable pulley 608c, 608d, 608e, and 608f, and each cable pulley 608c-f is configured to be operatively coupled to (e.g., has wrapped there around, at least partially) a corresponding one of the drive cables 408a-d. In the illustrated embodiment, the first drive cable 408a terminates at cable pulley 608d ultimately driven by actuation of the fourth capstan assembly 602d, the second drive cable 408b terminates at cable pulley 608f ultimately driven by actuation of the sixth capstan assembly 602f, the third drive cable 408c terminates at cable pulley 608c ultimately driven by actuation of the third capstan assembly 602c, and the fourth drive cable 408d terminates at cable pulley 608e ultimately driven by actuation of the fifth capstan assembly 602e.

Accordingly, actuation of the fourth capstan assembly 602d (via operation of the third drive input 506c of FIG. 5) will correspondingly control movement of the first drive cable 408a; actuation of the sixth capstan assembly 602f (via operation of the fifth drive input 506e of FIG. 5) will correspondingly control movement of the second drive cable 408b; actuation of the third capstan assembly 602c (via operation of the second drive input 506b of FIG. 5) will correspondingly control movement of the third drive cable 408c; and actuation of the fifth capstan assembly 602e (via operation of the fourth drive input 506d of FIG. 5) will correspondingly control movement of the fourth drive cable 408d.

Couplers for Biasing Mechanisms

Figure 10:
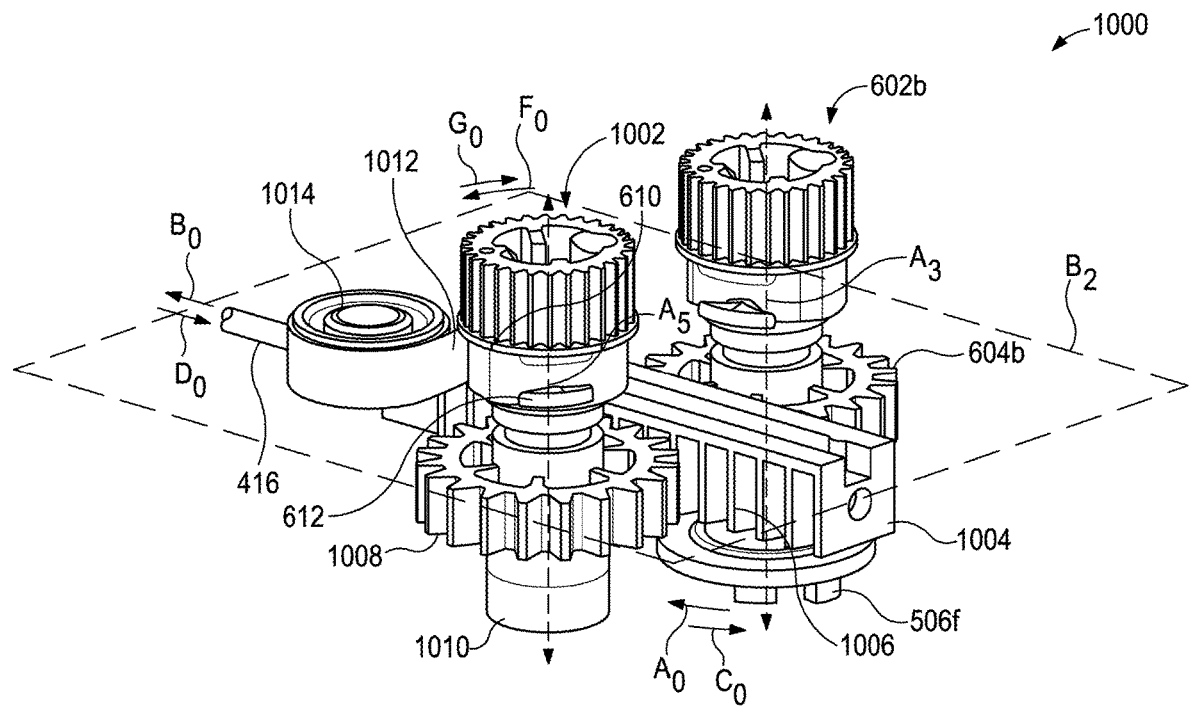
FIG. 10 is a perspective view of a dual pinion knife drive mechanism including a passive secondary input assembly including a biasing member operatively coupled to the passive secondary input assembly, according to one or more additional embodiments.

Still referring to FIG. 6, each of the second, fourth, fifth and sixth capstan assemblies 602b and 602d-f may include a coupler 610 thereon for facilitating connection to a biasing member (see FIG. 10). The couplers 610 are operatively coupled to or extend from the respective third, fourth, fifth and sixth drive input 506c-f (FIG. 5) such that actuation of the respective drive input 506c-f results in rotation of the respective coupler 610 along with the respective drive gear 604d-f and 604b. The couplers 610 include one or more hooks 612, which may be used to couple the biasing mechanism to the capstan assemblies 602b and 602d-f.

Although not shown in FIG. 6, an additional coupler 610 (not shown) may also be secured to, or form part of, the third capstan assembly 602c. A castellated peg 614 is provided, operatively coupled to or extending from the third drive gear 604 such that actuation of the second drive input 506b results in rotation of the castellated peg 614 along with the third drive gear 604c. In some embodiments, the castellated peg 614 is an integral part of the second drive input 506b. The castellated peg 614 may transmit torque to the additional coupler 610 coupled thereto such that the additional coupler 610 rotates along with the castellated peg 614, the third drive gear 604c and the second drive input 506b.

Figure 7A:
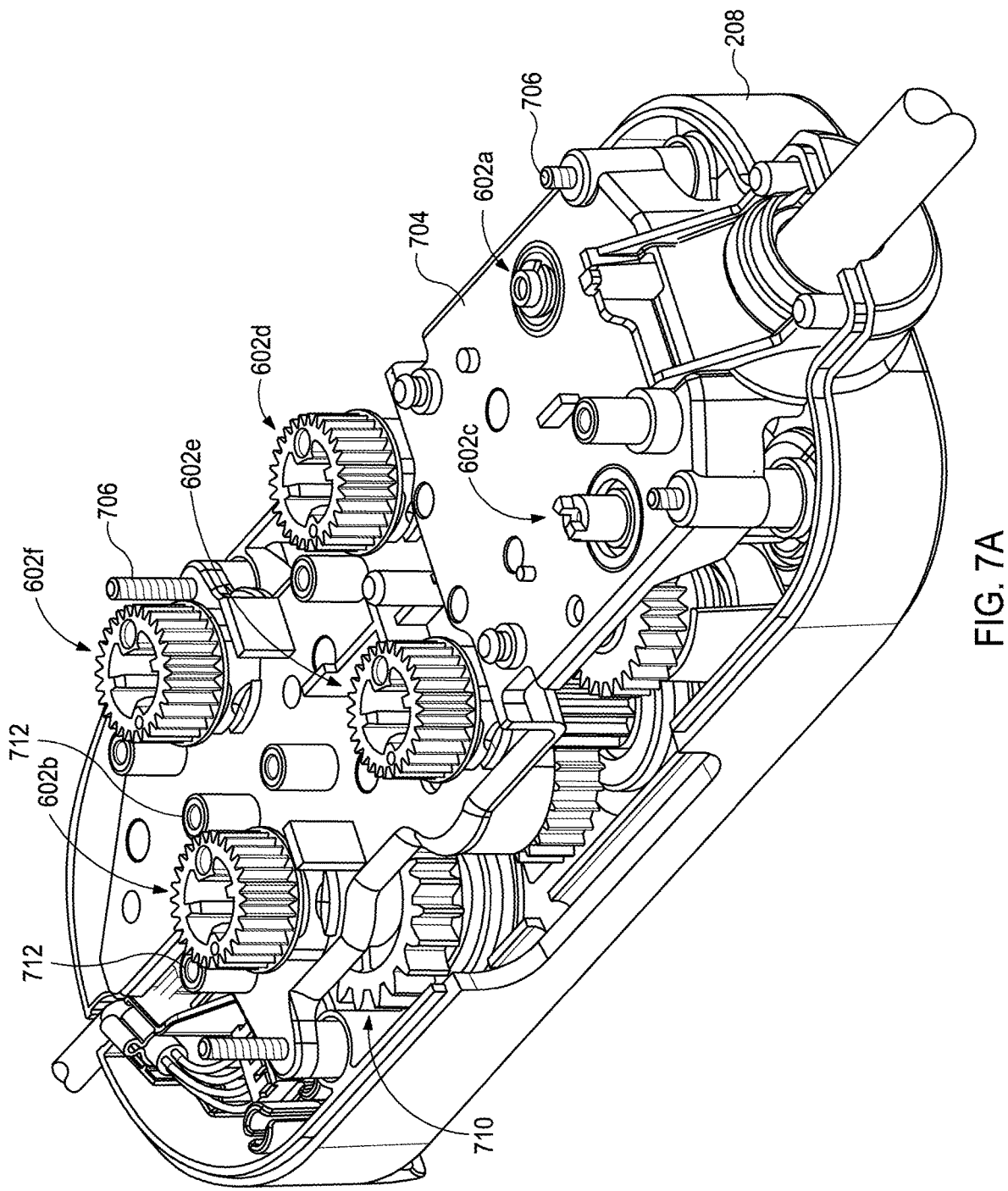
FIG. 7A is an exposed isometric view of the interior of the drive housing of FIG. 6, illustrating a chassis plate supporting the capstan assembly of a knife drive mechanism, according to one or more embodiments.

FIG. 7A is an exposed isometric view of the interior of the drive housing 208, illustrating a chassis plate 704, which may be secured to the drive housing 208 in a fixed position with fasteners 706, ultrasonic welding, adhesives or other attachment mechanisms. Each of the respective capstan assemblies 602a-f protrude through the chassis plate 704 such that the chassis plate 704 does not interfere with the rotation of the capstan assemblies 602a-f. The second capstan assembly 602b forms part of a knife drive mechanism 710, which is supported between the drive housing 208 and the chassis plate 704. The chassis plate 704 may include mounting posts 712 defined thereon, to which biasing members (FIG. 10) or other components may be mounted in a fixed position with respect to knife drive mechanism 710.

Figure 7B:
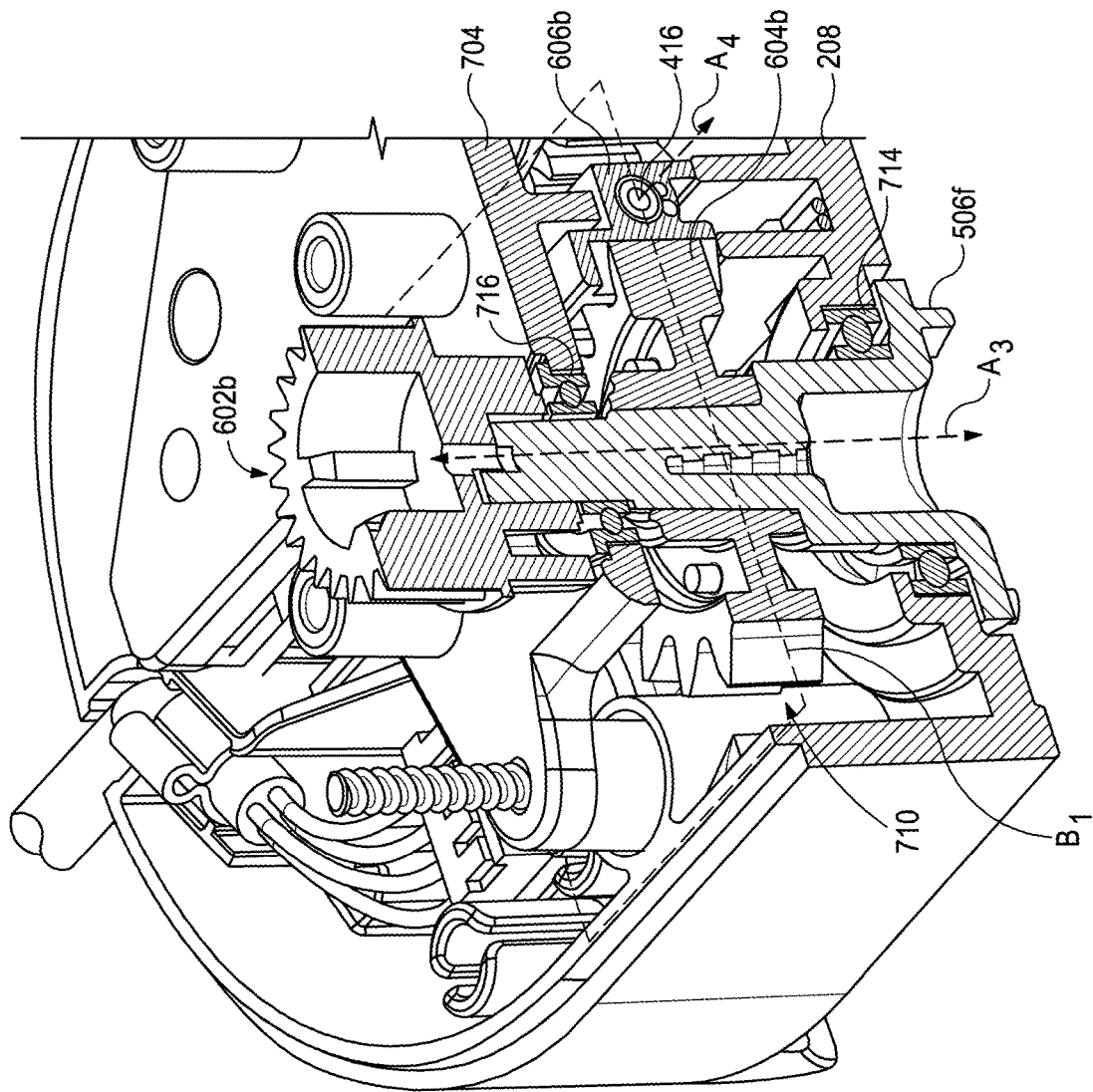
FIG. 7B is a perspective cross sectional view of the knife drive mechanism of FIG. 7A supported by the drive housing and the chassis plate.

FIG. 7B is a perspective cross sectional view of the knife drive mechanism 710 supported by the drive housing 208 and the chassis plate 704. Specifically, the sixth drive input 506f is radially supported by a first or lower bearing set 714 and a second or upper bearing set 716. In the illustrated embodiment, the first and second bearing sets 714, 716 are ball bearing sets having an outer race fixedly coupled to the bottom of the drive housing 208 and the chassis plate 704, respectively, and an inner race coupled to the sixth drive input 506f. In other embodiments, roller bearings, plastic bearings, bushings or other types or rotary bearings may be provided as the first and second bearing sets 714, 716. In still other embodiments, a plastic material of the drive housing 208 and the chassis plate 704 may engage the sixth drive input 506f and serve as the first and second bearing sets 714, 716. The bearing sets 714, 716 are both arranged to rotate about a rotational axis $A_3$ of the second capstan assembly 602b and prevent any tilting of the second capstan assembly 602b when subjected to radial loads. The drive gear 604b is coupled to the sixth drive input 506f between the lower and upper bearing sets 714, 716 such that drive gear 604b rotates in a drive plane $B_1$ orthogonal to the rotational axis $A_3$. The drive plane $B_1$ generally bisects the drive gear 604b.

The drive gear 604b is intermeshed with the driven gear 606b on the drive plane $B_1$ and moves longitudinally within the drive plane $B_1$. The drive rod 416 is coupled to the driven gear 606b within the drive plane $B_1$ such that the drive rod 416 is aligned with both the drive gear 604b and the driven gear 606b. The drive rod 416 is rotatably coupled to the longitudinally driven gear 606b about a longitudinal axis $A_4$, which extends centrally through the drive rod 416 and lies within the drive plane $B_1$. The longitudinal axis $A_4$ may be considered to lie within the drive plane $B_1$ even if the longitudinal axis $A_4$ does not lie directly on the drive plane $B_1$ that bisects the drive gear 604b, For example, in some embodiments, the longitudinal axis $A_4$ may be considered to lie within the drive plane $B_1$ where the longitudinal axis lies between planes defined by upper and lower surfaces of the drive gear 604b. Where the drive rod 416 translates and rotates at a height within the interface between the teeth of the drive gear 604b and the longitudinally driven gear 606b, the drive rod may be considered to be aligned with the drive plane $B_1$. The alignment of the drive rod 416 within the drive plane $B_1$ prevents any forces imparted to the drive rod 416 in operation from being transmitted to the second capstan assembly 602b and thereby inadvertently tilting the second capstan assembly 602b away from the rotational axis $A_3$. Supporting the drive gear 604b between the bearing sets 714, 716, rather than above or below both bearing sets 714, 716, prevents loads applied through the driven gear 606b to the drive gear 604b from creating bending moments that could tilt the capstan assembly 602b and lead to inaccurate movement of the knife 420 (FIG. 4B).

Figure 8A:
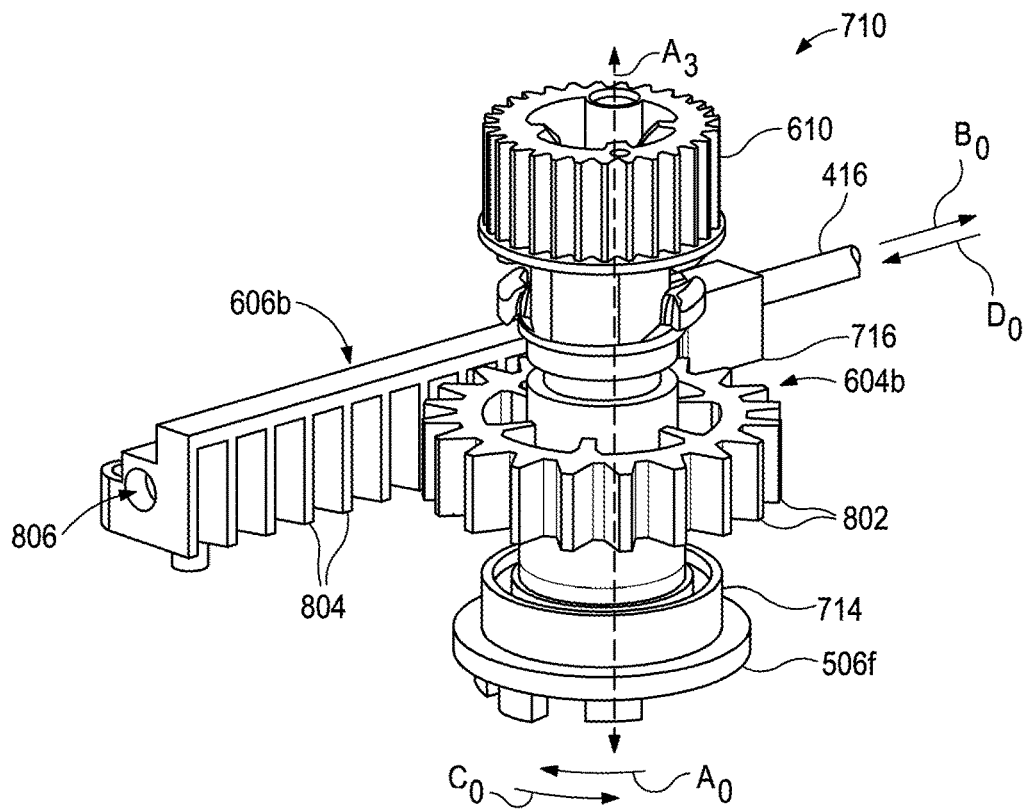
FIG. 8A is front perspective view of the knife mechanism of FIG. 7A independent of the drive housing and the chassis plate.

FIG. 8A is front perspective view of the knife drive mechanism 710 independent of the drive housing 208 and the chassis plate 704 (FIG. 7B). The drive gear 604b includes a plurality of circumferentially spaced teeth 802 capable of being operatively intermeshed with a plurality of longitudinally spaced teeth 804 on the driven gear 606b (e.g., the rack gear). An elongated bore 806 extends longitudinally through the driven gear 606b and receives the drive rod 416 therein. As described in greater detail below, the drive rod 416 is secured within the elongated bore 806 to permit rotation of the drive rod 416 with respect to the driven gear 606b and such that the drive rod 416 translates longitudinally along with the driven gear 606b.

In operation, the sixth drive input 506f may be rotated, e.g., by a tool driver, in a first angular direction, as indicated by the arrow $A_0$. The drive gear 604b and the coupler 610 are thereby induced to also rotate in the direction of arrow $A_0$. The first and second bearing sets 714, 716 support the rotational motion of the second capstan assembly 602b about the rotational axis $A_3$. Rotation of the drive gear 604b in the first angular direction $A_0$ drives the driven gear 606b and the drive rod 416 longitudinally in a distal direction, as indicated by arrow $B_0$. The knife 420 is thereby driven distally through the guide track 422 (FIG. 4B). The sixth drive input 506f may then rotated in a second angular direction, as indicated by the arrow $C_0$. The drive gear 604b is thereby induced to also rotate in the direction of arrow $C_0$, and the driven gear 606b and the drive rod 416 are thereby driven in a proximal direction, as indicated by arrow $D_0$. The knife 420 is thereby drawn proximally and back through the guide track 422 (FIG. 4B).

Figure 8B:
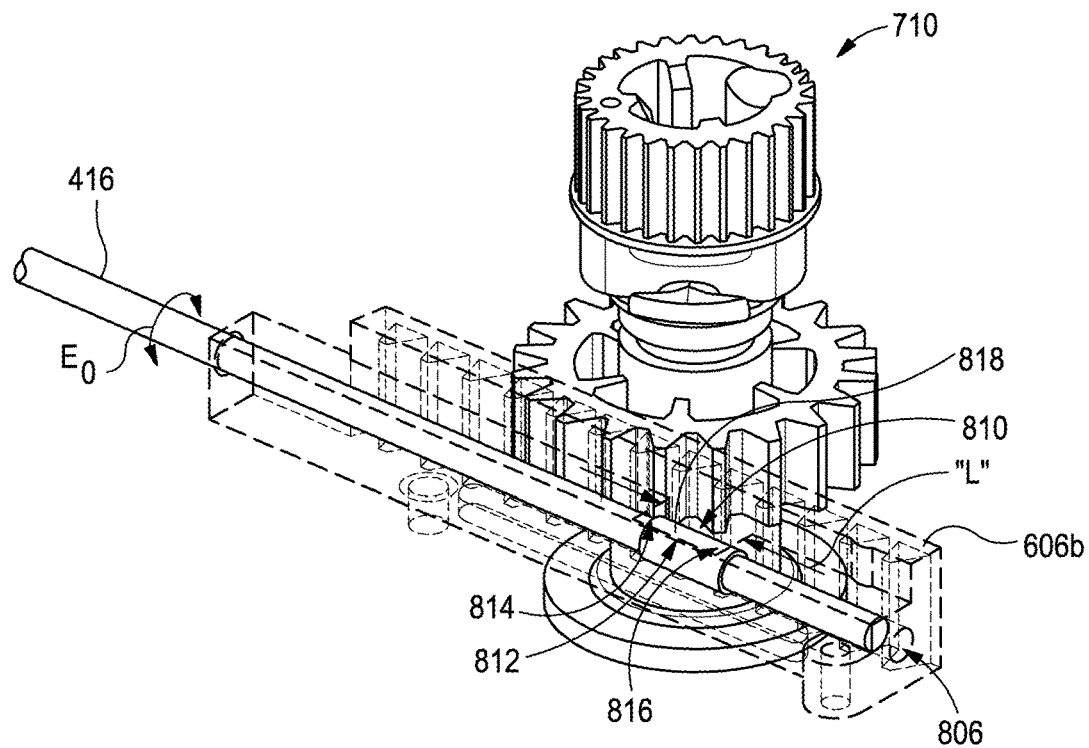
FIG. 8B is a rear perspective view of the knife drive mechanisms of FIG. 7A illustrating a coupling between a longitudinally driven gear and a drive rod.

FIG. 8B is a rear perspective view of the knife drive mechanism 710 illustrating a coupling 810 between the longitudinally driven gear 606b and the drive rod 416. The driven gear 606b includes an opening 812 extending between an exterior surface and the elongated bore 806. The opening 812 has a length "L" defined between a distal wall 814 and a proximal wall 816 of the opening 812. A rotating collar 818 may be crimped or otherwise secured to drive rod 416. In some embodiments, the rotating collar 818 may be affixed to the drive rod 416 by welding, adhesives, brazing, fasteners or set screws, overmold or other attachment mechanisms recognized in the art. The rotating collar 818 may be able to engage the distal and proximal walls 814, 816 to prevent minimal (or no) longitudinal motion between the drive rod 416 and the driven gear 606b. The rotating collar 818 and the drive rod 416 may be free to rotate within the longitudinal bore in the direction of arrows $E_0$.

FIGS. 9A and 9B are cross-sectional side views of the drive rod 416 extending within the longitudinal bore 806 of the driven gear 606b. FIG. 9A illustrates the drive rod 416 in an initial rotational position wherein the knife 420 is arranged in an upward orientation with respect to the driven gear 606b, and FIG. 9B illustrates the drive rod 416 in an second rotational position wherein the knife 420 is arranged in an downward orientation with respect to the driven gear 606b. The ability of the drive rod 416 to rotate freely within the driven gear 606b allows for unlimited roll of the end effector 204 (FIG. 4A), and prevents torsional loading of the drive rod 416 in operation which may increase the operational life and efficiency of the surgical tool 200 (FIG. 2). The drive rod 416 is rotatable about a longitudinal axis $A_4$, and in some embodiments, the longitudinal axis $A_4$ may lie within the drive plane $B_1$ (FIG. 7B).

The drive rod 416 may be constructed of a plurality of elongated members connected in series. Specifically, the drive rod 416 includes a series of longitudinally spaced rods and tubes coupled to one another to form the drive rod 416. The drive rod 416 includes a flexible rod 902 at a distal end thereof, to which the knife 420 is coupled (fixed). When assembled into the surgical tool 200, the flexible rod 902 extends through the wrist 206 and permits articulation of the end effector 204 with respect to the shaft 202 (FIG. 2). A proximal end of the flexible rod 902 extends into an inner lumen of an intermediate tube 904, and a proximal end of the intermediate tube 904 extends into the inner lumen of an outer tube 906. In some embodiments, a stiffening rod 908 may extend within the outer tube 906 to provide an appropriate stiffness to the proximal end of the drive rod 416. In one or more embodiments, the flexible rod 902, intermediate tube 904, outer tube 906 and stiffening rod 908 may be constructed from a variety of materials including, but not limited to, a metal (e.g., stainless steel, titanium, tungsten, nitinol, etc.) a polymer (e.g., ultra-high molecular weight polyethylene), a carbon fiber material or any combination thereof.

The flexible rod 902, intermediate tube 904 and the outer tube 906 may be fixedly joined to one another such that longitudinal motion therebetween is prohibited. In some embodiments, the flexible rod 902, intermediate tube 904 and the outer tube 906 may be joined to one another by crimping, welding, adhesives, brazing, fasteners or set screws, overmolding, etc. Once assembled, the drive rod 416 may be coupled to the driven gear 606. The rotating collar 818 may be inserted into the opening 812, and thereafter, the drive rod 416 may be inserted through the longitudinal bore 806 and through the rotating collar 818. The longitudinal position of the drive rod 416 within the longitudinal bore 806 may be adjusted to accommodate any tolerance stack-up that may have occurred assembling the drive rod 416. Once the longitudinal position is adjusted, the rotating collar 818 may be crimped, welded or otherwise fastened to the outer tube 906 of the drive rod 416 as described above.

FIG. 10 is a perspective view of a dual pinion knife drive mechanism 1000 including a passive secondary input assembly 1002, according to one or more additional embodiments. The secondary input assembly 1002 is generally rotatable about an axis $A_5$ parallel to and spaced from the rotational axis $A_3$ of the second capstan assembly 602b. The dual pinion drive mechanism 1000 includes the second capstan assembly 602b, which drives the longitudinal translation of a driven gear 1004 in a manner similar to which the second capstan assembly drives the driven gear 606b (FIG. 8A) as described above. The driven gear 1004 also includes longitudinally spaced teeth 1006 on an opposite lateral side thereof such that the teeth 1006 of the driven gear 1004 are intermeshed with both the drive gear 604b of the second capstan assembly 602b and a rotary pinion gear 1008 of the passive secondary input assembly 1002.

The passive secondary input assembly 1002 is supported on a stationary axle 1010, which may be affixed to a drive housing 208 (FIG. 6) in a stationary manner. The rotary pinion gear 1008 and a coupler 610 may be rotationally coupled to the stationary axle 1010 such that the rotary pinion gear 100 and the coupler 610 rotate in response to the longitudinal translation of the driven gear 1004. In some embodiments, the coupler 610 of the passive secondary input assembly 1002 may be coupled to a biasing member 1012. As illustrated, the biasing member 1012 is coupled to the coupler 610 by hooks 612 and imparts a bias on the coupler 610 and rotary pinion gear 1008 in the angular direction of arrow $F_0$. The bias of the biasing member 1012 may be transmitted through the rotary pinion gear 1008, the driven gear 1004 and the drive rod 416 to the knife 420 (FIG. 4B). This bias may increase a maximum firing load that may be applied by the knife 420 to cut tissue in operation. In other embodiments, the biasing member 610 may be coupled to the coupler 610 to impart a bias on the coupler 610 in an opposite angular direction as illustrated by the arrow $G_O$. A bias in the opposite angular direction may serve to return the knife 420 to the proximal end 422a of the drive track 422 (FIG. 4B), e.g., in the event the surgical tool 200 (FIG. 2) is removed from the tool driver.

In some example embodiments, the biasing member 1012 is a constant-force spring or constant-torque spring extending between and operably coupling a spool 1014 to the coupler 610. The constant-force spring may generally be constructed of a pre-stressed flat strip of spring material formed into virtually constant-radius coils around the spool 1014. The biasing member 1012 may be reverse wound onto the coupler 610 such that, when released, torque is applied to the input assembly 1002 as the biasing member 1012 returns to its natural curvature. In some embodiments, the biasing member 1012 may be provided without the spool 1014. The biasing member 1012 may be housed in a cavity (not shown), which may introduce friction and change the torque provided to the input assembly 1002. In some embodiments, the biasing member 1012 may be pre-stressed to provide near constant torque to the input assembly 1002, or even negative torque in some instances. Negative gradients of up to 50% may be achieved The biasing member 1012 may be constant force spring that applies a constant force to a rotational or linearly translating member, or a constant torque spring that applies a constant torque to a rotational member to provide a constant force on a driven member of the surgical tool 200. For example, the biasing member 1012 as illustrated may apply a constant force or constant torque to the input assembly 1002 such that a constant force is imparted to the drive rod 416 through the rotary pinion gear 1008 and the driven gear 1004. In other embodiments (not shown) a biasing member may apply a constant force to a linearly translating member, such as the longitudinally driven gear 1004, or the drive rod 416 itself to impart a constant force to the drive rod 416.

In some embodiments, the constant-force spring may comprise strips of spring-steel, aluminum, titanium, a polymer, an elastomer, a fiber mesh, or any combination of the foregoing. The strips may be generally relaxed when fully coiled around the spools 1014, and when the strips are extended or deflected by a loading force, the internal stress in the strips resists the loading force at a nearly constant rate. In other embodiments, the biasing member 1012 may comprise a torsion spring that progressively increases resistance rate with further deflection. The spool 1014 may be supported on a mounting post 712 of the chassis plate 704 (FIG. 7A). In other embodiments (not shown), an additional biasing member 1012 may be mounted on a spool 1014 and may be coupled to the coupler 610 of the second capstan assembly 602b (or any other capstan assembly described herein) without departing from the scope of the disclosure.

In operation, the sixth drive input 506f may be rotated, e.g., by a tool driver, in the first angular direction $A_O$, as described above, to translate the driven gear 1004 in the distal longitudinal direction $B_O$. The distal longitudinal motion of the driven gear 1004 induces the rotary pinion gear 1008 and the coupler 610 to rotate in the angular direction of arrow $F_O$. Rotation of the coupler 610 in the angular direction $F_O$ unwinds the biasing member 1012 from the coupler 610 and allows the biasing member 1012 to wind around the spool 1014 under the internal stresses of the biasing member 1012. The sixth drive input 506f may then be rotated in the second angular direction $C_O$, as described above, to translate the driven gear 1004 in the proximal direction $D_O$. The rotary pinion gear 1008 and the coupler 610 may thereby be induced to rotate in the angular direction indicated by arrow $G_O$, winding the biasing member from the spool 1014 to the coupler 610. In operation, the drive gear 604b and the rotary pinion gear 1008 rotate together in the same plane $B_2$ in which the drive rod 416 translates. In other embodiments, the drive gear 604b and the rotary pinion gear 1008 may rotate in different planes. In either case, the passive secondary input assembly 1002 stabilizes and biases the driven gear 1004 to ensure accurate motion of the knife 420.

Figure 11:
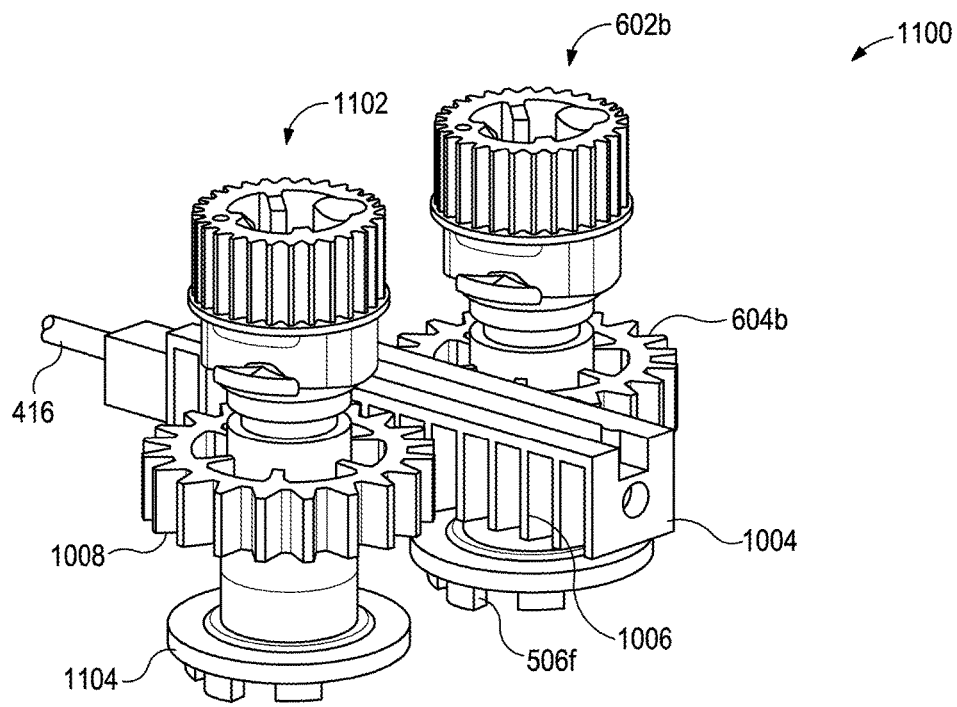
FIG. 11 is a perspective view of a dual pinion knife drive mechanism including an active secondary input assembly, according to one or more additional embodiments.

FIG. 11 is a perspective view of a dual pinion knife drive mechanism 1100 including an active secondary input assembly 1102, according to one or more additional embodiments. The active secondary input assembly 1102 may be identical, or a mirror image of, the second capstan assembly 602b. The sixth drive input 506f of the second capstan assembly 602b may be operated to drive the driven gear 1004 longitudinally as described above.

The active secondary input assembly 1102 may include a drive input 1104, which may be rotated by a tool driver to drive rotation of a rotary pinion gear 1108 in a manner similar to the sixth drive input 506f and the drive gear 604b. In some embodiments, the drive input 1104 may be operated such that the rotary pinion gear 1108 imparts a distal force on the driven gear 1004 whenever the drive gear 604b imparts a distal force on the driven gear 1004. In this manner, the active secondary input assembly 1102 may effectively double the cutting force which may be imparted to the drive rod 416 and the knife 420, as well as double the retraction force which may be applied in a proximal direction to return the knife 420 to a "zero" or "home" position. In some embodiments, the drive input 1104 may be operated such that the rotary pinion gear 1108 imparts a proximal bias to the driven gear 1004 when the drive gear 604b imparts a distal force to the driven gear. In this manner, the rotary pinion gear 1108 may engage a distally facing flank of the teeth 1006 while the drive gear 604b engages a proximally facing flank of the teeth, eliminating all backlash in the operation of the dual pinion knife drive mechanism 1100.

In FIGS. 10 and 11, the second capstan assembly 602b and the passive and active secondary input assemblies 1002, 1102 are illustrated without a first or lower bearing set 714 (FIG. 7B). It should be appreciated that in some embodiments, a first or lower bearing set 714 may be included without departing from the scope of the disclosure. In each of the embodiments of the knife drive mechanism 710, 1000, 1100 described above, the drive rod 416 is aligned in a plane with the drive gear 604b and rotary pinion gears 1008, 1108 which engage the driven gear 606b, 1004.

Figure 12:
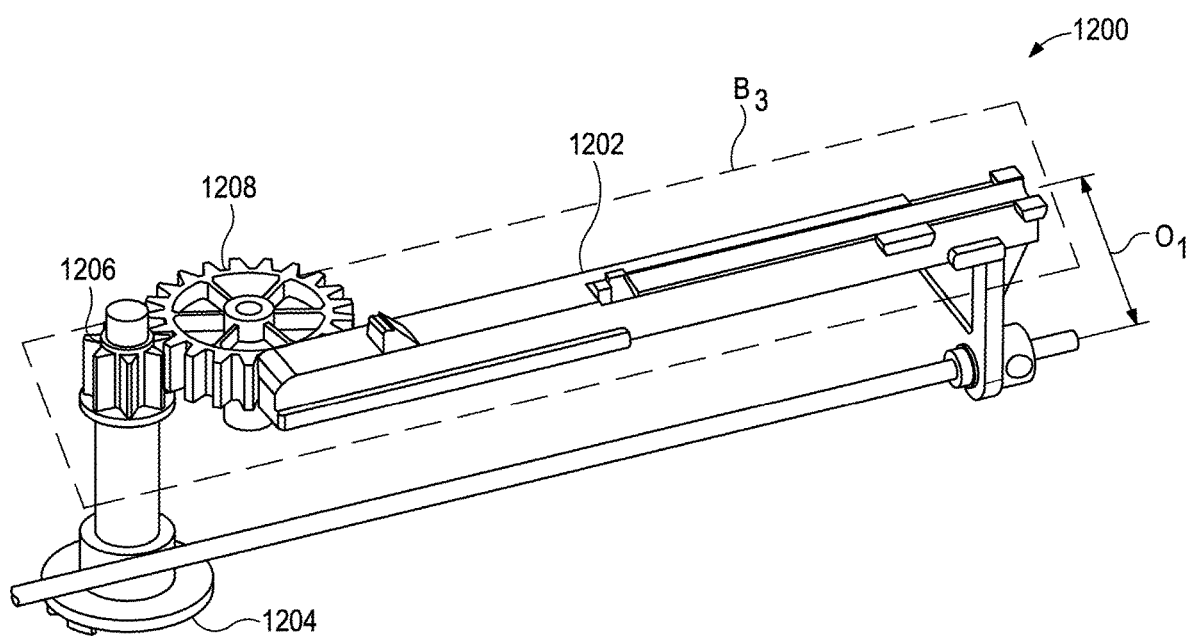
FIG. 12 is a perspective view of a knife drive mechanism including a drive rod offset from a longitudinally driven gear, according to one or more additional embodiments.

FIG. 12 is a perspective view of an alternative knife drive mechanism 1200 wherein the drive rod 416 offset from a longitudinally driven gear 1202. The knife drive mechanism 1200 includes a drive input 1204 which may be rotated by a tool driver (not shown). A drive gear 1206 on the drive input 1204 operatively engages an intermediate gear 1208, and the intermediate gear 1208 engages the longitudinally driven gear 1202. The drive gear 1206, intermediate gear 1208 and the longitudinally driven gear 1202 all move within a plane $B_3$. The drive rod 416 is supported at an offset distance of $O_1$ from the plane $B_3$ by an arm 1210 extending from the longitudinally driven gear 1202. The offset $O_1$ may cause a cantilever effect whereby loads applied to the drive rod 416 may tilt the longitudinally driven gear 1202 out of the plane $B_3$.

Embodiments disclosed herein include:

A. A surgical tool that includes a drive housing, a drive input rotatably mounted to a bottom of the drive housing, a capstan assembly arranged within the drive housing and rotatable about a rotational axis, the capstan assembly including a drive gear operatively coupled to the drive input such that rotation of the drive input about the rotational axis correspondingly actuates the drive gear to rotate in a drive plane orthogonal to the rotational axis, a longitudinally driven gear arranged within the drive housing and engageable with the drive gear such that the longitudinally driven gear translates between a proximal home position and a distal extended position in response to actuation of the drive gear, and a drive rod operatively coupled to the longitudinally driven gear and extending from the drive housing to a knife extendable within end effector of the surgical instrument, wherein the drive rod is aligned within the drive plane such that translation of the longitudinally driven gear induces a corresponding longitudinal translation of the drive rod within the drive plane.

B. A method of operating a surgical tool including positioning the surgical tool adjacent a patient, the surgical tool including: a drive housing; a drive input rotatably mounted to a bottom of the drive housing; capstan assembly arranged within the drive housing and including a drive gear operatively coupled to the drive input to rotate about a rotational axis; a longitudinally driven gear arranged within the drive housing and engageable with the drive gear to translate in response to actuation of the drive gear; and a drive rod coupled to the longitudinally driven gear and extending from the drive housing to an end effector of the surgical housing. The method further includes rotating the drive input to actuate the capstan assembly and thereby rotate the drive gear within a drive plane orthogonal to the rotational axis and to thereby translate longitudinally driven gear, and translating the drive rod within the drive plane in response to rotating the drive input within the drive plane.

C. A surgical tool system that includes a drive housing having a drive input rotatably mounted to a bottom thereof, a shaft extending distally from the drive housing and terminating at an end effector, a tool driver operably coupled to the drive housing to selectively rotate the drive input, a capstan assembly arranged within the drive housing and including a drive gear operatively coupled to the drive input such that rotation of the drive input correspondingly actuates the drive gear to rotate within a drive plane, a longitudinally driven gear arranged within the drive housing and engageable with the drive gear such that the longitudinally driven gear translates between a proximal position and a distal position in response to actuation of the drive gear, and a drive rod extending through the shaft and operatively coupled to the longitudinally driven gear to translate within the drive plane in response to translating the longitudinally driven gear.

Each of the embodiments A, B and C may have one or more of the following additional elements in any combination: Element 1: wherein the capstan assembly includes a first bearing set and a second bearing set, wherein the drive gear is coupled within the capstan assembly between the first and second bearing sets. Element 2: wherein the first bearing set is coupled to the drive housing and wherein the second bearing set is coupled to a chassis plate fixedly coupled to the drive housing. Element 3: wherein the drive rod is rotatably coupled to the longitudinally driven gear such that the drive rod is rotatable about a longitudinal axis extending within the drive plane. Element 4: wherein the longitudinally driven gear includes a longitudinal bore in which the drive rod is received and defines an opening intersecting the longitudinal bore and in which rotating collar is received. Element 5: wherein the rotating collar is affixed to the drive rod within the opening such that the drive rod is longitudinally secured within the longitudinal bore. Element 6: wherein the drive rod is constructed of a plurality of elongated members coupled to one another in series. Element 7: wherein the plurality of elongated members includes: an outer tube extending into the longitudinal bore and engaging the rotating collar; an intermediate tube extending into an inner lumen of the outer tube and extending distally from the outer tube; and a flexible rod extending into an inner lumen of the intermediate tube and extending distally from the intermediate tube, wherein the knife is mounted to the flexible rod. Element 8: further comprising a secondary input assembly rotatable about an axis generally parallel with the rotational axis of the capstan assembly, the secondary input assembly including a rotary pinion gear engaged with the longitudinally driven gear. Element 9: further comprising a biasing member operably coupled to the secondary input assembly to bias the rotary pinion gear against teeth of the longitudinally driven gear to thereby bias the longitudinally driven gear either toward the distal extended position or toward the proximal home position. Element 10: wherein the biasing member includes a constant force spring coupled to a coupler of the secondary input assembly such that rotation of the secondary input assembly is capable of winding or unwinding the constant force spring from the coupler, depending on rotation direction of the secondary input assembly. Element 11: wherein the secondary input assembly includes a secondary drive input rotatably mounted to the bottom of the drive housing and selectively driven by a tool driver.

Element 12: further comprising extending a knife along a guide track within the end effector in response to translating the drive rod within the drive plane. Element 13: further comprising supporting rotation of the drive input with first and second bearing sets coupled in the capstan assembly on opposite sides of the drive gear. Element 14: further comprising rotating the drive rod within a longitudinal bore of the longitudinally driven gear about a longitudinal axis aligned within the drive plane. Element 15: further comprising rotating a rotary pinion gear of a passive secondary input assembly in response to translating the longitudinally driven gear. Element 16: further comprising: rotating a secondary drive input of an active secondary input assembly about an axis spaced from the rotational axis of the capstan assembly; and imparting a longitudinal force to the longitudinally driven gear with a rotary pinion gear in response to rotating the secondary drive input.

Element 17: wherein the capstan assembly includes a first bearing set coupled below the drive gear along the rotational axis and a second bearing set coupled above the drive gear along the rotational axis.

By way of non-limiting example, exemplary combinations applicable to A, B and C include: Element 2 with Element 1; Element 4 with Element 3; Element 5 with Element 4; Element 6 with Element 5; Element 7 with Element 6; Element 9 with Element 8; Element 10 with Element 9; Element 11 with Element 8.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A surgical tool, comprising:
   a drive housing;
   a drive input rotatably mounted to a bottom of the drive housing;
   a capstan assembly arranged within the drive housing and rotatable about a rotational axis, the capstan assembly including a drive gear operatively coupled to the drive input such that rotation of the drive input about the rotational axis correspondingly actuates the drive gear to rotate in a drive plane orthogonal to the rotational axis;
   a longitudinally driven gear arranged within the drive housing and engageable with the drive gear such that the longitudinally driven gear translates between a proximal home position and a distal extended position in response to actuation of the drive gear; and
   a drive rod operatively coupled to the longitudinally driven gear and extending from the drive housing to a knife extendable within end effector of the surgical instrument,
   wherein the drive rod is aligned within the drive plane such that translation of the longitudinally driven gear induces a corresponding longitudinal translation of the drive rod within the drive plane.

2. The surgical tool of claim 1, wherein the capstan assembly includes a first bearing set and a second bearing set, wherein the drive gear is coupled within the capstan assembly between the first and second bearing sets.

3. The surgical tool of claim 2, wherein the first bearing set is coupled to the drive housing and wherein the second bearing set is coupled to a chassis plate fixedly coupled to the drive housing.

4. The surgical tool of claim 1, wherein the drive rod is rotatably coupled to the longitudinally driven gear such that the drive rod is rotatable about a longitudinal axis extending within the drive plane.

5. The surgical tool of claim 4, wherein the longitudinally driven gear includes a longitudinal bore in which the drive rod is received and defines an opening intersecting the longitudinal bore and in which rotating collar is received.

6. The surgical tool of claim 5, wherein the rotating collar is affixed to the drive rod within the opening such that the drive rod is longitudinally secured within the longitudinal bore.

7. The surgical tool of claim 6, wherein the drive rod is constructed of a plurality of elongated members coupled to one another in series.

8. The surgical tool of claim 7, wherein the plurality of elongated members includes:
   an outer tube extending into the longitudinal bore and engaging the rotating collar;
   an intermediate tube extending into an inner lumen of the outer tube and extending distally from the outer tube; and
   a flexible rod extending into an inner lumen of the intermediate tube and extending distally from the intermediate tube, wherein the knife is mounted to the flexible rod.

9. The surgical tool of claim 1, further comprising a secondary input assembly rotatable about an axis generally parallel with the rotational axis of the capstan assembly, the secondary input assembly including a rotary pinion gear engaged with the longitudinally driven gear.

10. The surgical tool of claim 9, further comprising a biasing member operably coupled to the secondary input assembly to bias the rotary pinion gear against teeth of the longitudinally driven gear to thereby bias the longitudinally driven gear either toward the distal extended position or toward the proximal home position.

11. The surgical tool of claim 10, wherein the biasing member includes a constant force spring coupled to a coupler of the secondary input assembly such that rotation of the secondary input assembly is capable of winding or unwinding the constant force spring from the coupler, depending on rotation direction of the secondary input assembly.

12. The surgical tool of claim 9, wherein the secondary input assembly includes a secondary drive input rotatably mounted to the bottom of the drive housing and selectively driven by a tool driver.

13. A method of operating a surgical tool, comprising:
   positioning the surgical tool adjacent a patient, the surgical tool including:
   a drive housing;
   a drive input rotatably mounted to a bottom of the drive housing;
   a capstan assembly arranged within the drive housing and including a drive gear operatively coupled to the drive input to rotate about a rotational axis;
   a longitudinally driven gear arranged within the drive housing and engageable with the drive gear to translate in response to actuation of the drive gear; and a drive rod coupled to the longitudinally driven gear and extending from the drive housing to an end effector of the surgical housing;

rotating the drive input to actuate the capstan assembly and thereby rotate the drive gear within a drive plane orthogonal to the rotational axis and to thereby translate longitudinally driven gear; and translating the drive rod within the drive plane in response to rotating the drive input within the drive plane.

14. The method of claim 13, further comprising extending a knife along a guide track within the end effector in response to translating the drive rod within the drive plane.

15. The method of claim 13, further comprising supporting rotation of the drive input with first and second bearing sets coupled in the capstan assembly on opposite sides of the drive gear.

16. The method of claim 13, further comprising rotating the drive rod within a longitudinal bore of the longitudinally driven gear about a longitudinal axis aligned within the drive plane.

17. The method of claim 13, further comprising rotating a rotary pinion gear of a passive secondary input assembly in response to translating the longitudinally driven gear.

18. The method of claim 13, further comprising:

rotating a secondary drive input of an active secondary input assembly about an axis spaced from the rotational axis of the capstan assembly; and imparting a longitudinal force to the longitudinally driven gear with a rotary pinion gear in response to rotating the secondary drive input.

19. A surgical tool system, comprising:

a drive housing having a drive input rotatably mounted to a bottom thereof;

a shaft extending distally from the drive housing and terminating at an end effector;

a tool driver operably coupled to the drive housing to selectively rotate the drive input;

a capstan assembly arranged within the drive housing and including a drive gear operatively coupled to the drive input such that rotation of the drive input correspondingly actuates the drive gear to rotate within a drive plane;

a longitudinally driven gear arranged within the drive housing and engageable with the drive gear such that the longitudinally driven gear translates between a proximal position and a distal position in response to actuation of the drive gear; and a drive rod extending through the shaft and operatively coupled to the longitudinally driven gear to translate within the drive plane in response to translating the longitudinally driven gear.

20. The surgical tool system of claim 19, wherein the capstan assembly includes a first bearing set coupled below the drive gear along the rotational axis and a second bearing set coupled above the drive gear along the rotational axis.

\* \* \* \* \*